United States Patent
Kimura

(10) Patent No.: US 9,386,369 B2
(45) Date of Patent: Jul. 5, 2016

(54) AUDIO SIGNAL PROCESSING APPARATUS AND METHOD OF CONTROLLING THE SAME

(75) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 13/116,743

(22) Filed: May 26, 2011

(65) Prior Publication Data

US 2011/0305351 A1    Dec. 15, 2011

(30) Foreign Application Priority Data

Jun. 10, 2010   (JP) .................................. 2010-133349

(51) Int. Cl.
    *H04B 15/00*   (2006.01)
    *H04R 3/00*    (2006.01)
    *G11B 20/24*   (2006.01)
    *G10L 21/0208* (2013.01)
    *G03B 31/00*   (2006.01)

(52) U.S. Cl.
    CPC *H04R 3/00* (2013.01); *G03B 31/00* (2013.01); *G10L 21/0208* (2013.01); *G11B 20/24* (2013.01); *H04R 2499/11* (2013.01)

(58) Field of Classification Search
    CPC ............ H04R 3/00; H04R 3/005; H04R 3/02; H04R 29/00; H04R 29/004; H04R 29/005; H04R 2410/03; H04R 2410/05; H04R 2410/07; H04R 2499/11; G10L 21/0208; G11B 20/24; H03G 3/32; H03G 3/342; H03G 3/344; H03G 3/345; G03B 31/00
    USPC ............................. 381/94.1, 94.2–94.4, 94.8
    See application file for complete search history.

(56) References Cited

U.S. PATENT DOCUMENTS

| | | | |
|---|---|---|---|
| 5,563,954 A * | 10/1996 | Ono et al. ..................... 381/94.7 |
| 7,596,231 B2 * | 9/2009 | Samadani ..................... 381/94.2 |
| 8,036,398 B2 * | 10/2011 | Ozawa ......................... 381/94.1 |
| 2004/0032509 A1 * | 2/2004 | Owens et al. .............. 348/222.1 |
| 2010/0027810 A1 * | 2/2010 | Marton ........................ 381/94.1 |

FOREIGN PATENT DOCUMENTS

| | | |
|---|---|---|
| JP | 04-233873 | 8/1992 |
| JP | 2006-203376 | 8/2006 |
| JP | 2006-262241 | 9/2006 |
| JP | 2006-270591 A | 10/2006 |
| JP | 2008-077707 A | 4/2008 |

OTHER PUBLICATIONS

May 3, 2012 Chinese Office Action, which is enclosed with English Translation, that issued in Chinese Patent Application No. 201110156794.7.

* cited by examiner

*Primary Examiner* — Davetta W Goins
*Assistant Examiner* — Daniel Sellers
(74) *Attorney, Agent, or Firm* — Cowan, Liebowitz & Latman, P.C.

(57) ABSTRACT

When a first noise and second noise to be generated after the first noise are generated within a predetermined period, a noise reduction unit is controlled so as to execute a first noise reduction process for an audio signal in a period including the first noise and not to execute the first noise reduction process for an audio signal in a period including the second noise.

20 Claims, 20 Drawing Sheets

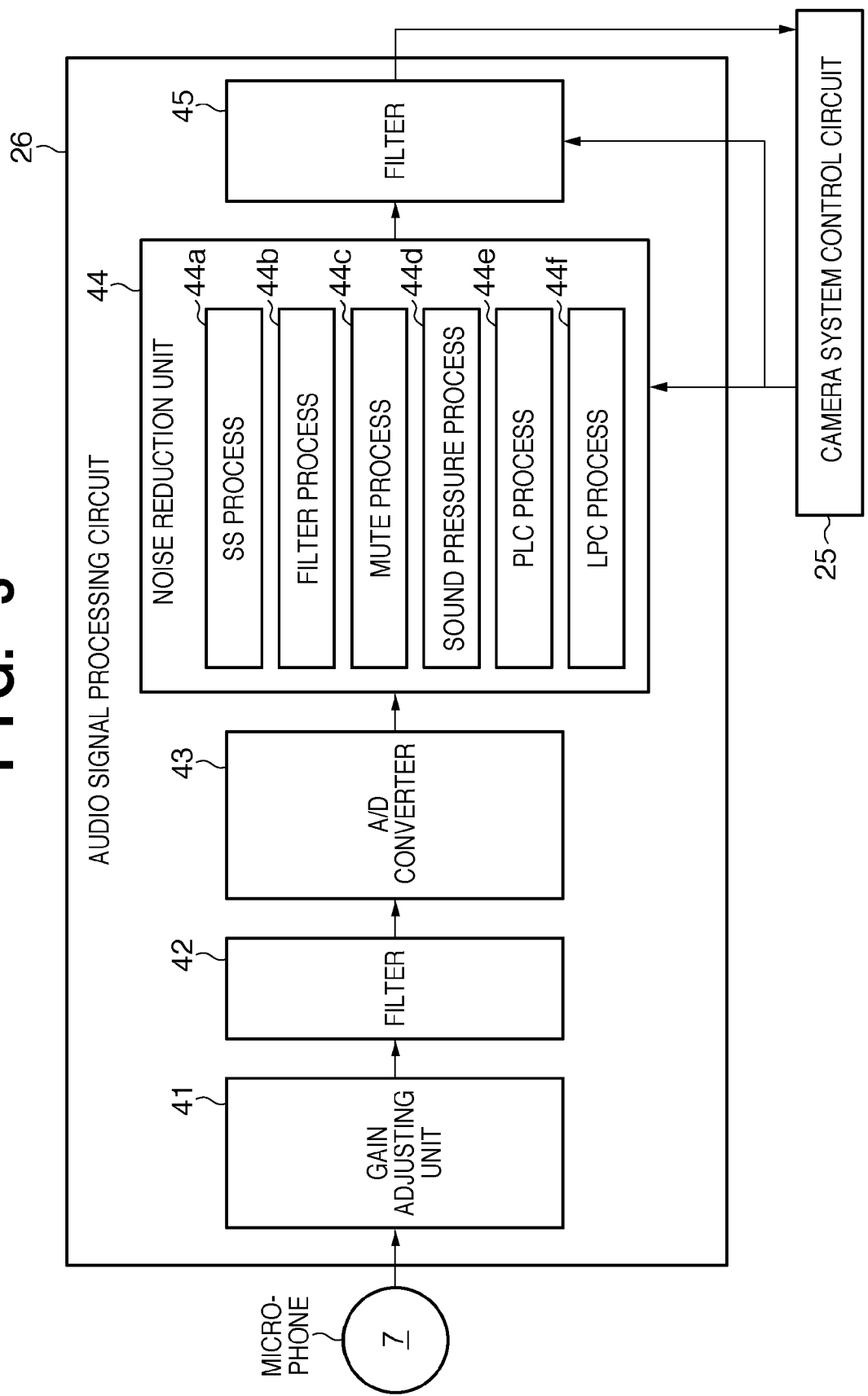

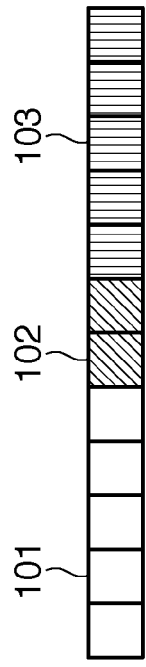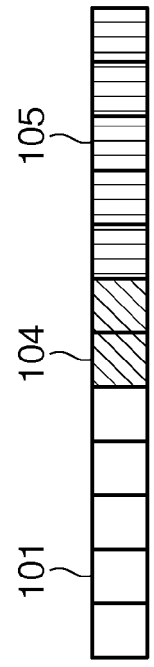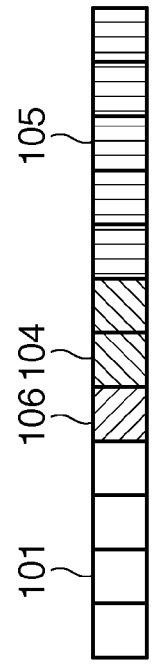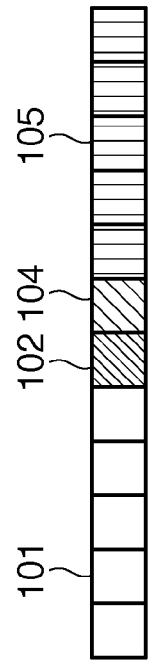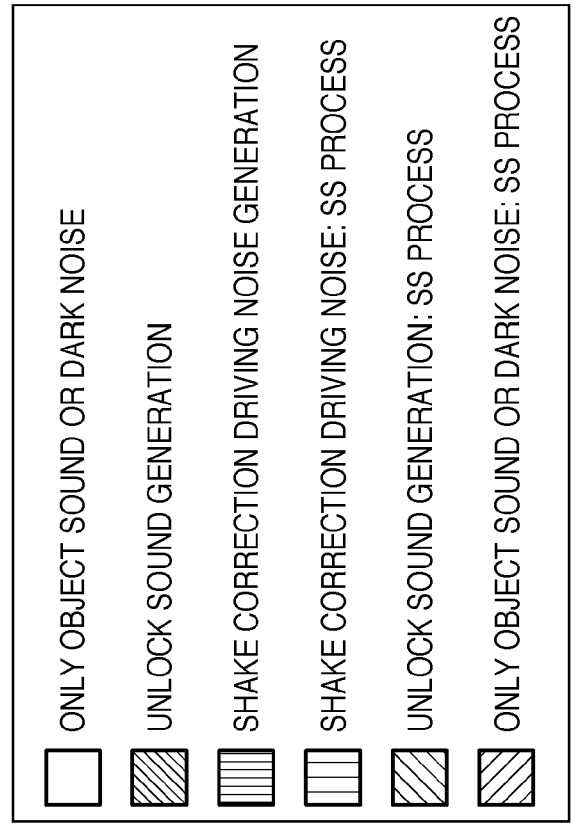
FIG. 16A  FIG. 16B  FIG. 16C  FIG. 16D

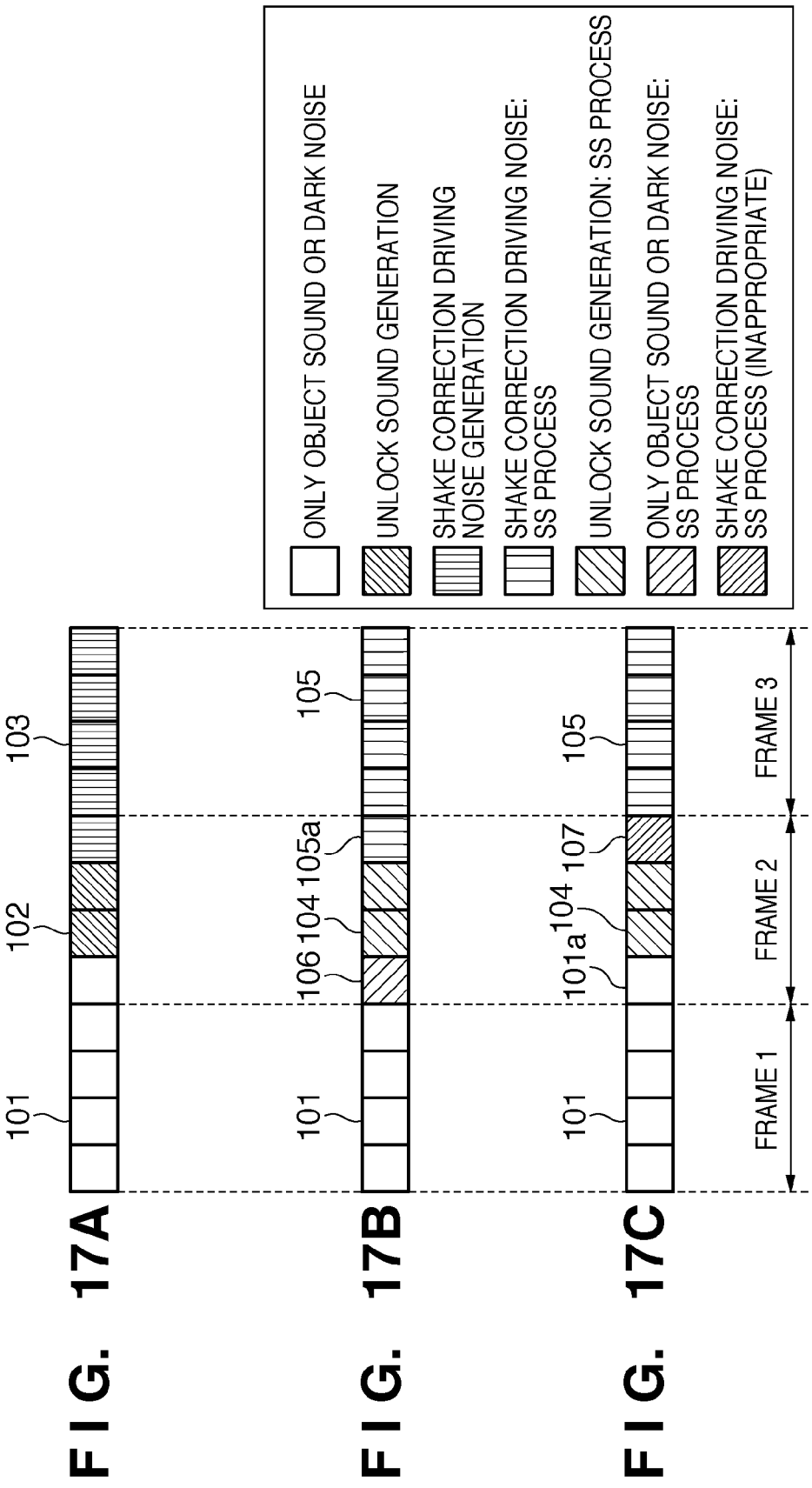

AUDIO SIGNAL PROCESSING APPARATUS AND METHOD OF CONTROLLING THE SAME

BACKGROUND OF THE INVENTION

1. Field of the Invention

The present invention relates to an audio signal processing apparatus and a method of controlling the same.

2. Description of the Related Art

Recently, a camera capable of capturing a moving image is known as an audio signal processing apparatus. The apparatus is demanded to be, for example, insusceptible to driving sound (noise) generated upon driving the internal driving units of the apparatus. Various image capture apparatuses have been proposed to obtain the above-described characteristics.

For example, Japanese Patent Laid-Open No. 04-233873 discloses selecting an appropriate filter (noise reduction function) in accordance with the noise source type. Japanese Patent Laid-Open No. 2006-203376 discloses selectively using a plurality of noise reduction functions in accordance with the noise generation time. Japanese Patent Laid-Open No. 2006-262241 discloses reducing hard disk driving noise by a technique (predictive process) of replacing an audio signal during the noise generation period with a signal calculated based on the audio signals before and after the noise generation period.

However, although the techniques disclosed in Japanese Patent Laid-Open No. 04-233873 and 2006-203376 can alternately select an appropriate means from the plurality of noise reduction functions, it is impossible to use both techniques while maintaining the advantage of the plurality of noise reduction functions. In addition, when performing a plurality of noise reduction processes using a limited resource, problems of the process time, process capability, and the like arise. Especially, when a plurality of noise components are generated, and they are to be reduced by a predictive process of replacing all noise components with a signal calculated based on the audio signals before and after the noise generation period, as in Japanese Patent Laid-Open No. 2006-262241, the operation load increases, resulting in an increase in the cost.

SUMMARY OF THE INVENTION

The present invention has been made in consideration of the aforementioned problems, and realizes an audio signal processing technique allowing appropriately noise reduction by executing a process other than a predictive process first to reduce noise to some degree and then execute a predictive process.

In order to solve the aforementioned problems, the present invention provides an audio signal processing apparatus including a driving unit, comprising: an audio acquisition unit configured to acquire an audio signal representing an audio in the vicinity; a noise reduction unit configured to reduce noise included in the audio signal, the noise being caused by driving of the driving unit; a control unit configured to control the noise reduction unit in accordance with the driving of the driving unit, wherein the noise reduction unit has a first noise reduction process of reducing the noise based on an audio signal in a period including the noise, and a second noise reduction process of replacing the audio signal in the period including the noise with a signal generated based on an audio signal in a period that does not include the noise, and the control unit controls the noise reduction unit so as to execute the second noise reduction process after execution of the first noise reduction process when a specific driving unit is driven.

In order to solve the aforementioned problems, the present invention provides a method of controlling an audio signal processing apparatus including a driving unit, an audio acquisition unit configured to acquire an audio signal representing an audio in the vicinity, and a noise reduction unit configured to reduce noise included in the audio signal, the noise being caused by driving of the driving unit, comprising: performing control of the noise reduction unit so as to execute a first noise reduction process of reducing the noise based on an audio signal in a period including the noise, and after that, execute a second noise reduction process of replacing the audio signal in the period including the noise with a signal generated based on an audio signal in a period that does not include the noise when a specific driving unit is driven.

In order to solve the aforementioned problems, the present invention provides an audio signal processing apparatus including a driving unit, comprising: an audio acquisition unit configured to acquire an audio signal representing an audio in the vicinity; a noise reduction unit configured to reduce noise included in the audio signal, the noise being caused by driving of the driving unit; a control unit configured to control the noise reduction unit in accordance with the driving of the driving unit, wherein the noise reduction unit has a first noise reduction process of replacing an audio signal in a period including the noise with a signal generated based on an audio signal in a period that does not include the noise, and when first noise and second noise to be generated after the first noise are generated within a predetermined period, the control unit controls the noise reduction unit so as to execute the first noise reduction process for an audio signal in a period including the first noise and not to execute the first noise reduction process for an audio signal in a period including the second noise.

In order to solve the aforementioned problems, the present invention provides a method of controlling an audio signal processing apparatus including a driving unit, an audio acquisition unit configured to acquire an audio signal representing an audio in the vicinity, and a noise reduction unit configured to reduce noise included in the audio signal, the noise being caused by driving of the driving unit, comprising: when first noise and second noise to be generated after the first noise are generated within a predetermined period, controlling the noise reduction unit so as to execute a first noise reduction process for an audio signal in a period including the first noise and not to execute the first noise reduction process for an audio signal in a period including the second noise.

According to the present invention, it is possible to implement effective noise reduction while reducing the operation load of the apparatus by executing a process other than a predictive process first to reduce noise to some degree and execute the predictive process.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a block diagram of an audio signal processing circuit;

FIGS. 16A to 16D are explanatory views of the SS process start timing and a plurality of noise reduction processes;

FIGS. 17A to 17C are explanatory views of the frames and the subtraction gain of the SS process;

DESCRIPTION OF THE EMBODIMENTS

Various exemplary embodiments, features, and aspects of the invention will be described in detail below with reference to the drawings.

First Embodiment

The first embodiment in which an audio signal processing apparatus of the present invention is applied to an image capture apparatus will be described below with reference to FIGS. 1A to 4C.

Figure 1A:
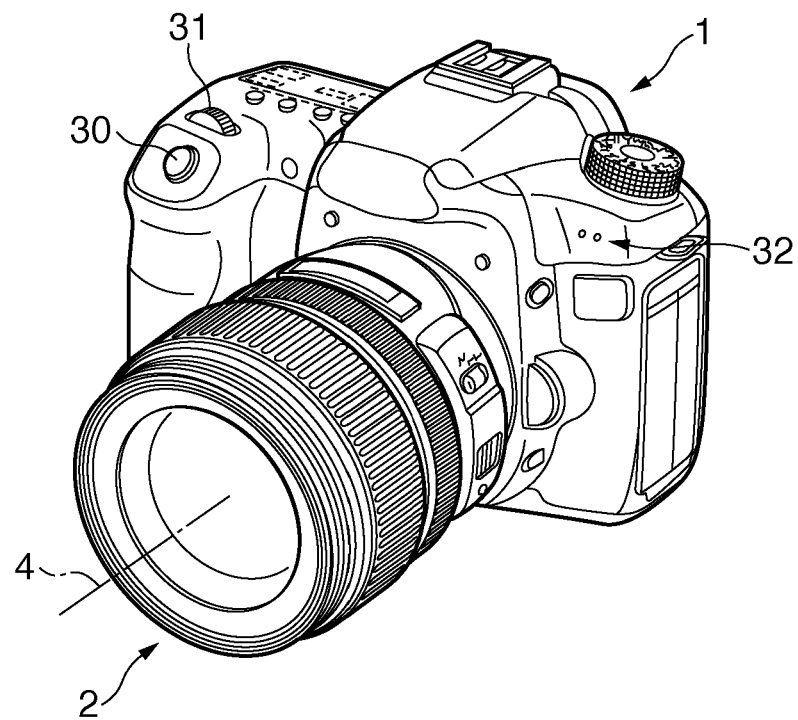
FIG. 1A is a perspective view of an image capture apparatus according to an embodiment of the present invention.
Figure 1B:
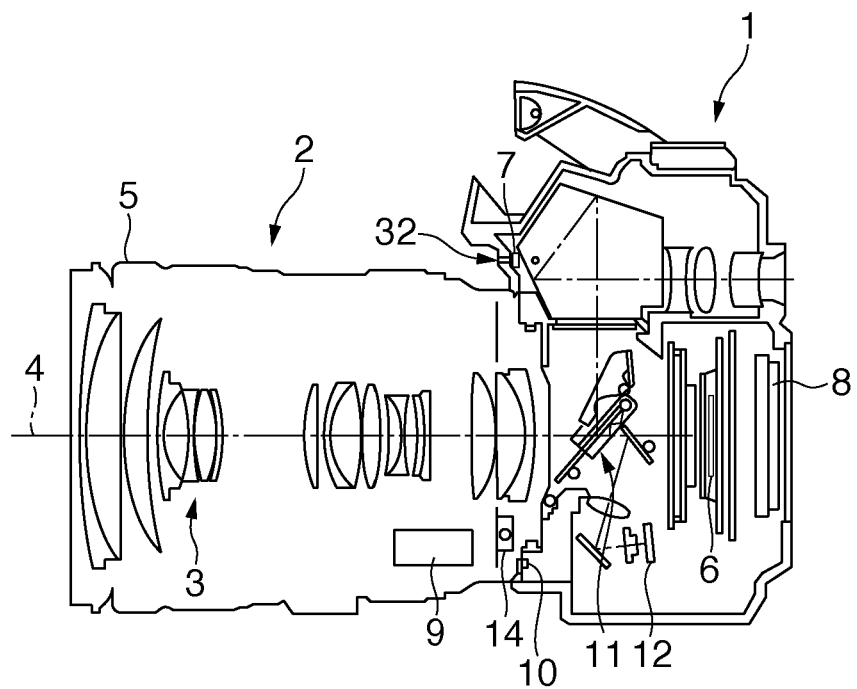
FIG. 1B is a side sectional view of the image capture apparatus according to the embodiment of the present invention.

Referring to FIGS. 1A and 1B, reference numeral 1 denotes an image capture apparatus; 2, a photographing lens attached to the image capture apparatus 1; 3, an image capture optical system; 4, an optical axis of a lens; 5, a lens barrel; 6, an image sensor; 7, a microphone provided on the image capture apparatus 1 to pick up sound components around it; and 8, a display device provided on the rear surface of the image capture apparatus 1. Reference numeral 9 denotes an optical system driving unit configured to adjust the image capture optical system 3; 10, a contact that connects the image capture apparatus 1 and the photographing lens 2; 11, a so-called quick return mirror mechanism; 12, a focus detection unit including an AF (Auto Focus) sensor; 14, a shake sensor that detects the shake of the apparatus 1; 31, an operation button; and 32, a plurality of opening portions of the microphone 7 provided on the apparatus 1. The image capture apparatus of this embodiment can acquire/record sound by the microphone 7 simultaneously with image acquisition. Reference numeral 30 denotes a release button. In this embodiment, an image capture apparatus capable of detaching a photographing lens will be described. However, the photographing lens need not always be detachable.

Note that the opening portions 32 of the microphone 7 are provided at portions that are not projected onto FIG. 1B. However, FIG. 1B schematically illustrates the microphone 7 and the opening portions 32 so as to clarify the positions of the microphone 7 and the opening portions 32.

A still image capture operation will be explained. The image capture apparatus 1 detects the focus/exposure using the photographing lens 2, the focus detection unit 12, and an exposure detection unit (not shown). At the same time, the image capture apparatus 1 drives/adjusts part of the image capture optical system 3, thereby forming an object image near the light-receiving plane of the image sensor 6. In addition, the stop is adjusted to attain appropriate exposure. Various conditions for image capture are set in accordance with the user's operation of the release button 30. Object image information photoelectrically converted by the image sensor 6 is acquired in synchronism with the operation of the release button and recorded in a memory 24 shown in FIG. 2.

A moving image capture operation will be described next. Before capturing a moving image, the user presses a live view button (not shown) to display an image sensed by the image sensor 6 on the display device 8. Live view indicates displaying image information sensed by the image sensor 6 on the display device 8 in real time. In synchronism with the operation of a moving image capture button (not shown), the image capture apparatus 1 acquires image information from the image sensor 6 at a preset frame rate, acquires audio information from the microphone 7, and records them in the memory 24 in synchronism with each other. When adjustment of the image capture optical system 3 is necessary during moving image capture, the optical system driving unit 9 adjusts it. The image capture operation ends in synchronism with the operation of moving image capture button. Even during moving image capture, the image capture apparatus 1 can capture a still image at an arbitrary timing in accordance with the operation of the release button 30.

Figure 2:
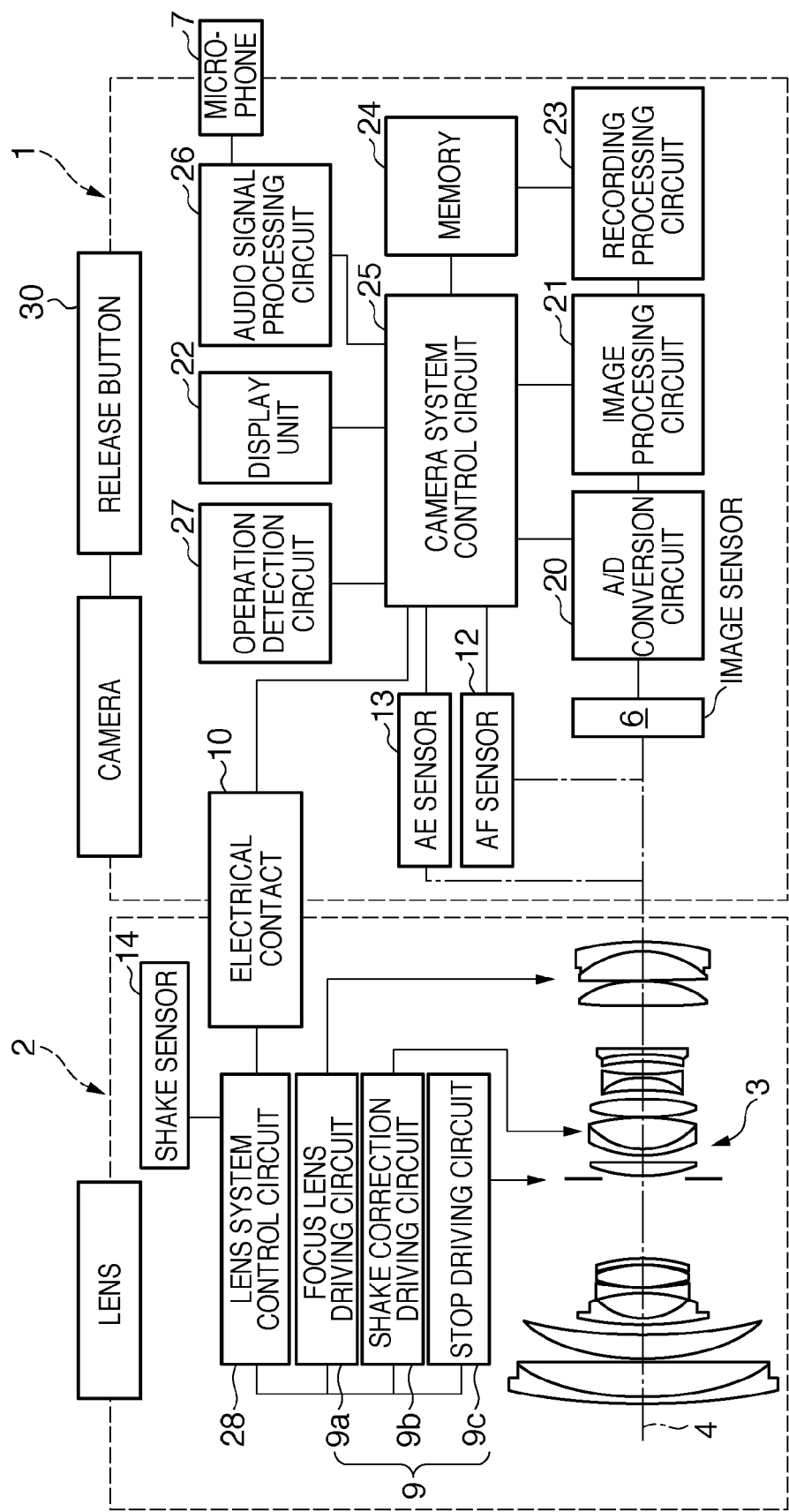
FIG. 2 is a block diagram of the image capture apparatus.

The arrangements of the photographing lens 2 and a digital camera serving as the image capture apparatus 1 will be described next with reference to FIG. 2. Referring to FIG. 2, the image capture apparatus 1 mainly includes an image capture system, an image processing system, an audio processing system, a recording/reproduction system, and a control system. The image capture system includes the image capture optical system 3 and the image sensor 6. The image processing system includes an A/D conversion circuit 20 and an image processing circuit 21. The audio processing system includes the microphone 7 and an audio signal processing circuit 26. The recording/reproduction system includes a recording processing circuit 23 and the memory 24. The control system includes a camera system control circuit 25, the focus detection unit (including the AF sensor) 12, an exposure detection unit (including an AE sensor) 13, the shake sensor 14, an operation detection circuit 27, a lens system control circuit 28, the release button 30, and the optical system driving unit 9. The optical system driving unit 9 includes a focus lens driving circuit 9a, a shake correction driving circuit 9b, and a stop driving circuit 9c.

The image capture system performs an optical process of forming an image of light from an object on the imaging plane of the image sensor 6 through the image capture optical system 3. During a pre-image capture operation such as aiming, the light beam is partially guided to the focus detection unit 12 via a mirror provided in the quick return mirror mechanism 11. When the control system appropriately adjusts the image capture optical system 3, as will be described later, the image sensor 6 is exposed to an object light in an appropriate light amount, and the object image is formed near the image sensor 6. The image processing circuit 21 includes a white balance circuit and a gamma correction circuit that process an image signal received from the image sensor 6 via the A/D conversion circuit 20, and an interpolation operation circuit that increases the resolution by an interpolation operation.

The audio processing system causes the audio signal processing circuit 26 to appropriately process the audio signal from the microphone 7, thereby generating a recording audio signal. At the time of moving image capture, the recording processing circuit 23 to be described later compresses the recording audio signal in association with the captured image. The recording processing circuit 23 outputs the image signal to the memory 24 and also generates/stores a display signal to be output to a display unit 22. The recording processing circuit 23 also associates/compresses a still image, a moving image, an audio, and the like using a predetermined method. The functions of the audio signal processing circuit 26 can be implemented by, for example, either a chip dedicated to audio processing or the memory and the CPU that controls the overall camera.

The camera system control circuit 25 generates a timing signal for image capture or the like and outputs it to the image sensor 6. The focus detection unit 12 detects the in-focus state of the image capture optical system 3. The exposure detection unit 13 detects the object brightness directly in still image capture or by processing the image signal from the image sensor 6 in moving image capture. The lens system control circuit 28 appropriately drives the lens 2 in accordance with the control signal from the camera system control circuit 25, thereby adjusting the image capture optical system 3. In this embodiment, the camera is assumed to be of an interchangeable lens type, and an example will be described in which the lens system control circuit 28 controls driving of the interchangeable lens. If the camera is not of the interchangeable lens type, the functions of the lens system control circuit 28 may be executed by the camera system control circuit 25. The functions of the camera system control circuit 25 can be implemented by either the combination of the memory and the main CPU configured to control the overall image capture apparatus or a microcomputer chip that controls the entire apparatus.

The control system controls the image capture system, the image processing system, and the recording/reproduction system in accordance with the user operation. For example, when the operation detection circuit 27 detects the press of the release button 30, the control system controls driving of the image sensor 6, the operation of the image processing circuit 21, the compression process of the recording processing circuit 23, and the like. The control system also controls the state of each segment of the display unit 22 to cause it to display information regarding the optical viewfinder, the liquid crystal monitor, or the like.

The image capture optical system adjusting operation by the control system will be described. The focus detection unit 12 and the exposure detection unit 13 are connected to the camera system control circuit 25. In still image capture, an appropriate focus position and stop position are obtained based on the signals from these units. The camera system control circuit 25 outputs an instruction to the lens system control circuit 28 via the contact 10. The lens system control circuit 28 appropriately controls the focus lens driving circuit 9a and the stop driving circuit 9c. On the other hand, in moving image capture, the focus lens driving circuit 9a finely moves the focus lens. In addition, the signal from the image sensor 6 is analyzed to obtain the focus position based on the contrast of the signal. Furthermore, the stop position is obtained based on the signal level of the image sensor 6.

The shake sensor 14 is connected to the lens system control circuit 28. In the camera shake correction mode of still image capture, the shake correction driving circuit 9b is appropriately driven and controlled based on the detection signal from the shake sensor 14. On the other hand, in the camera shake correction mode of moving image capture, the shake correction driving circuit 9b can be driven as in the still image capture. So-called electronic anti-vibration that changes the read position of the image sensor 6 based on the detection signal from the shake sensor 14 is also possible. The shake sensor 14 is formed from, for example, an acceleration detection sensor and detects the vibration of the image capture apparatus.

An image capture operation including audio recording such as moving image capture will be described. In the image capture operation including audio recording, sound (to be referred to as mechanical driving noise hereinafter) generated upon mechanically driving the camera body, the lens, and the like is unnecessary and is regarded as noise. In this specification, noise indicates not background noise such as white noise but the above-described mechanical driving noise.

The audio signal processing circuit 26 and a noise reduction unit will be described with reference to FIG. 3. Referring to FIG. 3, reference numeral 41 denotes a gain adjusting unit; 42, a filter; 43, an A/D converter; 44, a noise reduction unit; and 45, a filter. The signal obtained from the microphone 7 is output to the gain adjusting unit 41. The gain adjusting unit 41 adjusts the signal level of the microphone 7 so as to make full use of the dynamic range of the A/D converter 43. More specifically, when the signal level of the microphone 7 is low, the gain is increased to amplify the signal. When the signal level of the microphone 7 is high, the gain is decreased to prevent saturation.

The filter 42 is formed from, for example, a low-pass filter having an appropriate cutoff frequency in consideration of the sampling frequency of the A/D converter 43. When the microphone 7 is located, for example, near a device that generates a specific frequency, the filter 42 may include an appropriate notch filter in addition to the above-described low-pass filter. The A/D converter 43 converts the signal processed by the gain adjusting unit 41 and the filter 42 into a digital signal.

The noise reduction unit 44 includes a plurality of noise reduction units. In the example shown in FIG. 3, the noise reduction unit 44 includes an SS process 44a, a filter process 44b, a mute process 44c, a sound pressure process 44d, a PLC process 44e, and an LPC process 44f. The SS process is a process based on spectral subtraction. In this specification, a method by spectral subtraction will expediently be referred to as an SS method, and a process by the SS method as an SS process. However, these are not formal terms. The filter process 44b is a process such as a low- or high-pass process of cutting/passing an appropriate band. The mute process 44c removes a noise component by replacing the noise component signal with silence. The sound pressure process 44d is a process of smoothing the envelope of an audio signal. The PLC process 44e is a process based on PLC (Packet Loss Concealment) defined by ITU-T Recommendation G.711— Appendix I. The LPC process 44f is a process based on a linear predictive filter using an LPC (Linear Predictive Coefficient). Details of each noise reduction method will be described later. It is possible to operate the plurality of noise reduction units selectively or in combination with each other based on an instruction from the camera system control circuit 25. The filter 45 is used to perform an appropriate filter process as needed after noise reduction. If unnecessary, the filter 45 can directly pass or appropriately delay a signal without noise reduction. The operations of these noise reduction units are controlled by the camera system control circuit 25.

In this embodiment, the PLC process 44e and the LPC process 44f that are noise reduction (predictive process) based on prediction form a first noise reduction unit, and the SS process 44a, the filter process 44b, the mute process 44c, and the sound pressure process 44d form a second noise reduction unit. A plurality of second noise reduction units may be used as needed.

The noise reduction method of each noise reduction unit will be explained. The SS method is a process of subtracting a spectrum, as the name implies. A noise spectrum (in this specification, a spectrum obtained by, for example, Fourier-transforming noise is called a noise spectrum) is prepared in advance and subtracted from an acquired audio spectrum. In this embodiment, the noise spectrum is identified in advance and stored in the memory 24 of the image capture apparatus 1. As another noise spectrum acquisition method, the spectrum in a period supposed to be a silence period in the neighborhood can be used. However, noise components of interest in this specification are mechanical driving noise components. Their spectra can be obtained in advance and are therefore stored in the memory 24 of the image capture apparatus 1.

The SS process method assumes that noise components are additively mixed in the object sound. An acquired audio x(t) is given by $$x(t)=s(t)+n(t) \quad (1)$$

where s(t) is the object sound, n(t) is noise, and t is time. When equation (1) is Fourier-transformed, X(ω) is obtained as a result of Fourier transform of x(t)

$$X(\omega)=S(\omega)+N(\omega) \quad (2)$$

where S(ω), and N(ω) are the results of Fourier transform of s(t), and n(t), and w is the frequency. In the image capture apparatus 1, the audio signal is divided into frames by applying an appropriate window function and subjected to a sequential process. For the sake of simplicity, a description will be made placing focus on a specific frame. To obtain S(ω), N(ω) is subtracted from X(ω), as is apparent from equation (2). Hence, S'(ω) is given as the estimated value of S(ω) obtained using N'(ω):

$$S'(\omega) = \begin{cases} (|X(\omega)|-|N'(\omega)|)e^{j\angle X(\omega)}, & \text{if } |X(\omega)|-|N'(\omega)|) > \beta \\ \beta, & \text{otherwise} \end{cases} \quad (3)$$

where N'(ω) is the estimated value of N(ω), β is the flooring coefficient, and ∠ indicates the operation of obtaining the argument of a complex number. As is apparent from equation (3), the spectrum is obtained by performing subtraction using a noise spectrum obtained in advance, and the value X(ω) is directly used as the phase. The flooring coefficient β is introduced to suppress the distortion of an audio by the SS method (β=0 in the original SS method). The SS method assumes that noise components additively act, as indicated by equation (1). In fact, the noise components may be added in opposite phases so as to weaken each other in the acquired audio. For this reason, the difference obtained by subtracting N'(ω) from X(ω) may be a negative value. In the SS method, if the value is smaller than β, the process is performed to make it equal to β.

Finally, S'(ω) is inversely Fourier-transformed to obtain s'(t) as the audio that has undergone the SS process.

Figure 4A:
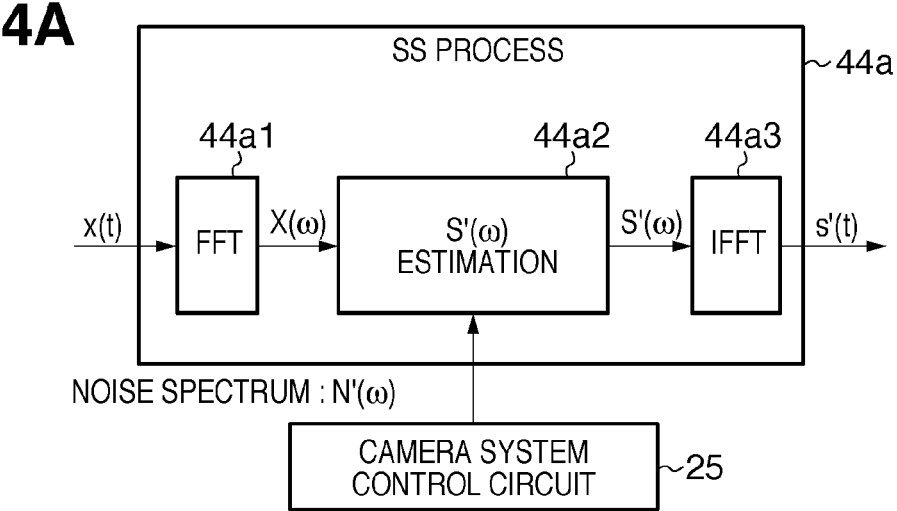
FIG. 4A is a block diagram of an SS processing circuit.

FIG. 4A schematically shows the above-described SS process. In FIG. 4A, FFT represents a fast Fourier transform process including a window function process; IFFT, an inverse fast Fourier transform process; and S'(ω) estimation, the process of equation (3). As is apparent from FIG. 4A, the SS method is also applicable to a single channel signal (monaural audio). However, N'(ω) needs to be given in advance by some method.

The filter process is a process of cutting off an appropriate spectral region. Like the SS method, the noise model assumes that noise components are additively mixed in the object sound. When the filter is applied to both sides of equation (2), we obtain the estimated value S'(ω) of S(ω):

$$S'(\omega)=F(\omega)X(\omega)=F(\omega)\{S(\omega)+N(\omega)\}=F(\omega)S(\omega)+F(\omega)N(\omega) \quad (4)$$

where S'(ω) is the estimated value of S(ω), F(ω) is a value representing the frequency characteristic of the filter. If F(ω) can be determined to satisfy $$F(\omega)S(\omega)\approx S(\omega) \quad (5)$$

$$F(\omega)N(\omega)\approx 0 \quad (6)$$

F(ω)X(ω) almost equals S(ω), as can be seen from equation (4). Expressions (5) and (6) indicate that the region where the object sound exists is separated from the region where the noise exists in the frequency domain, and F(ω) is designed to cut off the region where the noise exists. Finally, S'(ω) is inversely Fourier-transformed to obtain s'(t) as the audio that has undergone the filter process.

In the actual apparatus, the filter is also often applied in the time domain to omit Fourier transform. In the time domain, $$s'(t)=f(t)*x(t)=f(t)*\{s(t)+n(t)\}=f(t)*s(t)+f(t)*n(t)\approx s(t) \quad (7)$$

is calculated, where * represents convolution integral, and s'(t) is the estimated value of the object signal. In addition, f(t) is a time-domain filter having a frequency characteristic almost equivalent to F(ω), which can be designed by a digital filter designing method such as the REMEZ method.

When designing a digital filter, an appropriate one of the filter process in the frequency domain and that in the time domain is selected. This determination is done in consideration of, for example, the filter characteristic and the order of the time-domain filter to ensure the performance.

Figure 4B:
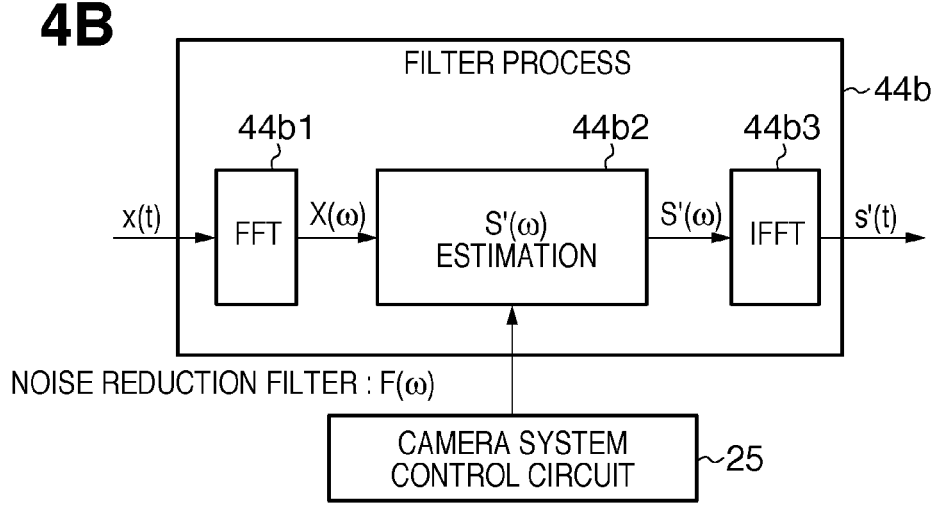
FIGS. 4B and 4C are block diagrams of a filter processing circuit.
Figure 4C:
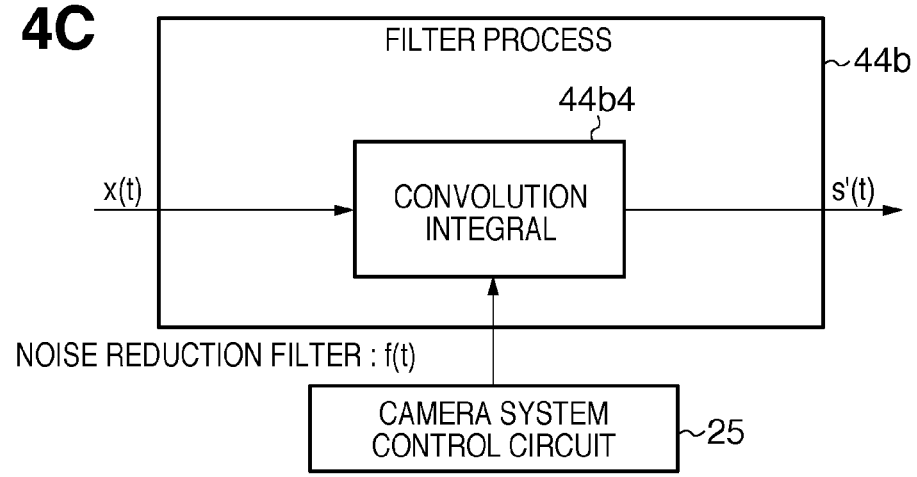

FIG. 4B schematically shows the filter process in the frequency domain. In FIG. 4B, FFT represents a fast Fourier transform process including a window function process; IFFT, an inverse fast Fourier transform process; and S'(ω) estimation, the process of equation (4). FIG. 4C schematically shows the filter process in the time domain. In FIG. 4C, convolution integral represents the process of equation (7). As is apparent from FIGS. 4B and 4C, these filter processes are also applicable to a single channel signal (monaural audio). However, F(ω) or f(t) needs to be given in advance by some method.

As described above, the mute process is a process of replacing a noise component signal with silence. That is, during the time noise is generated, an estimated value s'(t) of the object signal is given as $$s'(t)=0 \quad (8)$$

Figure 5A:
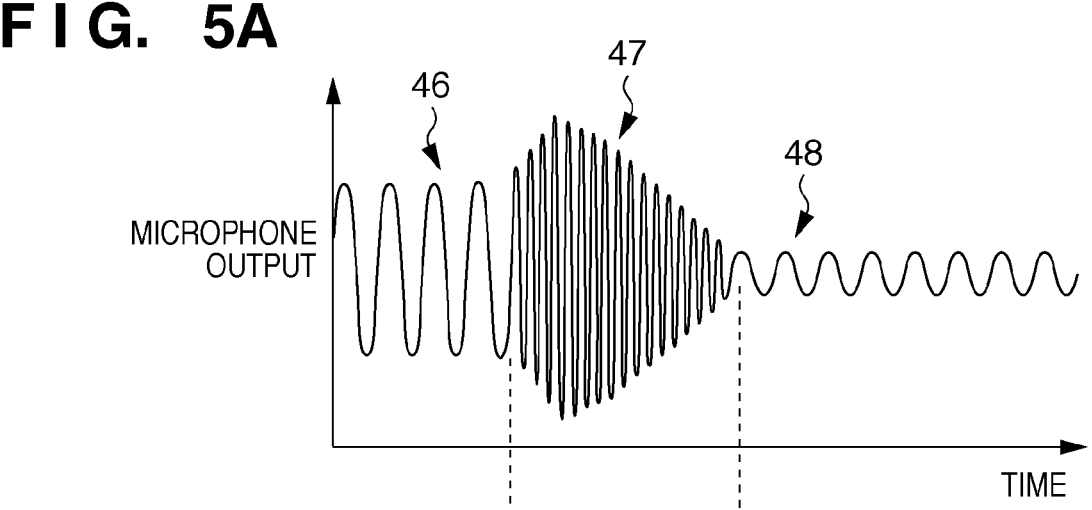
FIGS. 5A to 5C are explanatory views of a sound pressure process.
Figure 5B:
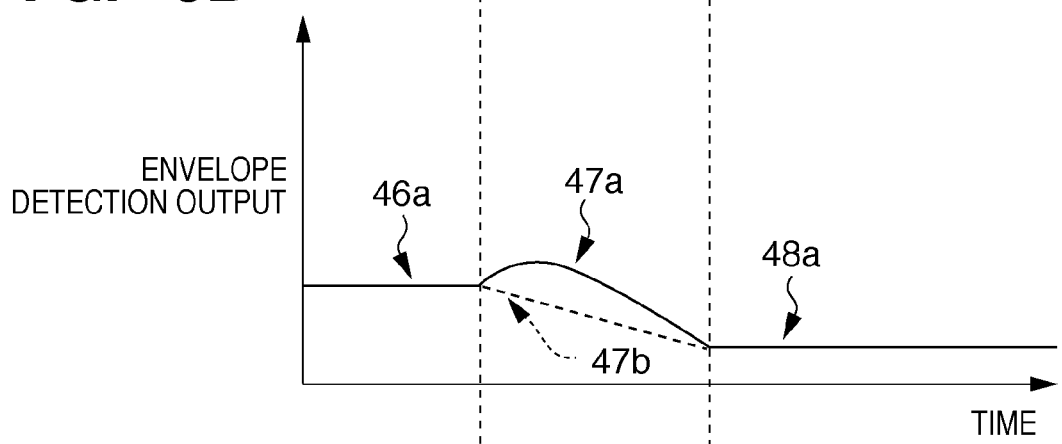
Figure 5C:
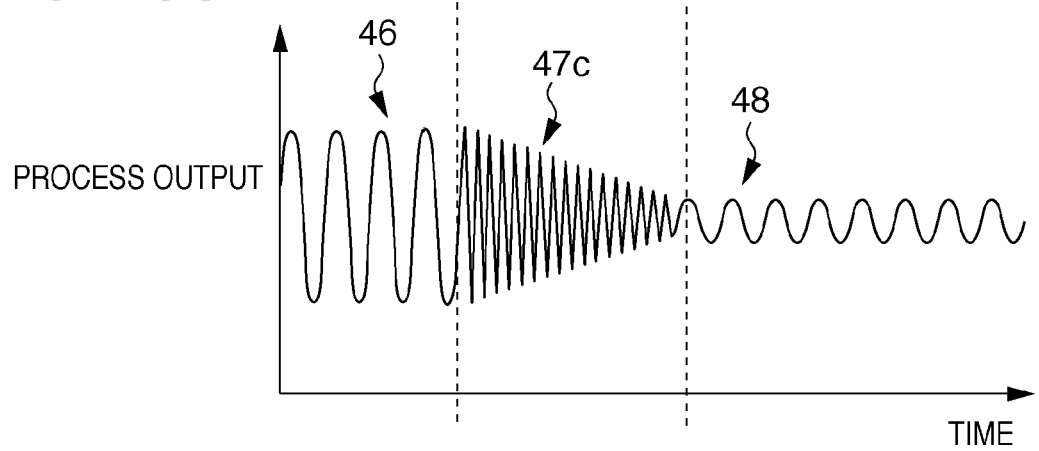

The sound pressure process 44d will be described here with reference to FIGS. 5A to 5C. FIG. 5A shows the audio signal before the sound pressure process. FIG. 5B shows the envelope detection output of the signal shown in FIG. 5A. FIG. 5C shows the audio signal after the sound pressure process. Referring to FIGS. 5A to 5C, the abscissa represents time, and the time positions match each other. The vertical broken lines running through FIGS. 5A to 5C schematically indicate the same times. The ordinate of FIGS. 5A to 5C represents the signal level.

In FIG. 5A, reference numeral 46 denotes an audio signal before noise generation; 47, an audio signal during noise generation; and 48, an audio signal after noise generation. The audio signals 46 and 48 contain object sound or dark noise. The audio signal 47 is made of object sound with noise being superimposed on it. Hence, the audio signal 47 has a noticeable value upon envelope detection to be described later.

In FIG. 5B, reference numerals 46a, 47a, and 48a denote envelope detection outputs of the audio signals 46, 47, and 48, respectively; and 47b, an envelope output in the noise generation period obtained by the sound pressure process. In the sound pressure process, the envelope of the input signal is detected first to obtain the signal in FIG. 5B from the signal in FIG. 5A. Next, the audio signal levels before and after the noise generation period are detected. This can be done by checking the signals 46a and 48a near the noise generation period. An envelope is generated so as to smoothly connect the audio signal levels before and after the noise generation period. For example, the period is interpolated by a straight line, like the envelope detection output 47b in FIG. 5B.

Finally, the signal level is controlled while segmenting the audio signal 47 during noise generation into appropriate periods so that the envelope 47a in the noise period changes to the envelope 47b. An audio signal 47c in FIG. 5C is thus obtained. The above-described sound pressure process can reduce the influence of noise, although it affects the level of the object sound in the noise period.

The filter process can conveniently be performed before the sound pressure process. After the filter process has been performed to reduce noise in the band where object sound exists not too much, the above-described sound pressure process is executed. This allows an appropriate reduction in the mechanical driving noise components.

Figure 13:
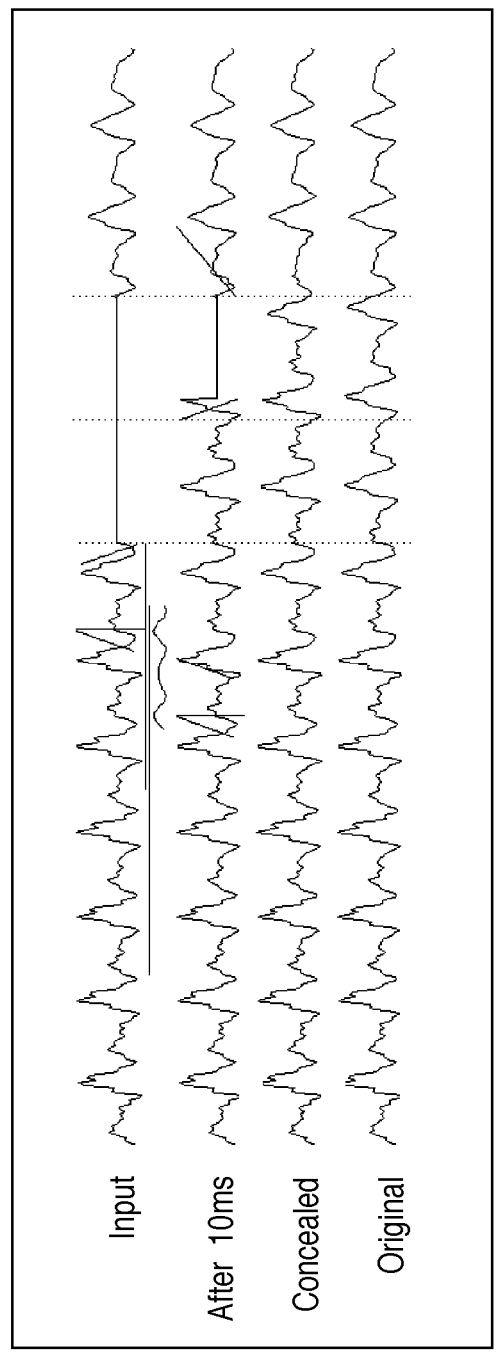
FIG. 13 is an explanatory view of a PLC process.

The PLC process 44e will be described next with reference to FIG. 13. FIG. 13 shows an excerption from FIG. I.1 of ITU-T Recommendation G.711—Appendix I. Referring to FIG. 13, the abscissa represents time, and the ordinate represents the audio signal level. The four waveforms shown in FIG. 13 indicate an input signal, a signal obtained by correcting the signal for 10 ms, a signal that has undergone the concealment process, and an original signal from above. In ITU-T Recommendation G.711, the frame size is 10 ms. FIG. 13 shows a case in which information of 2 frames=20 ms is lost. The PLC process 44e conceals the portion where packet loss has occurred (the portion of the Input waveform indicated by the broken lines in FIG. 13) using preceding and succeeding information. When a loss has occurred, the normalized autocorrelation of the signal stored in the buffer is calculated. Regarding the pitch at which the normalized autocorrelation is maximized as the fundamental frequency of the signal, the signal is shifted by an amount corresponding to the obtained pitch and copied. At the same time, the copy signal is extended and smoothly added to the signal stored in the buffer so no discontinuity occurs between the copy signal insertion portion and the signal before it. On the other hand, when the communication has returned from the packet loss state to the normal state, the pitch is similarly detected from the current signal. The signal is shifted by an amount corresponding to the pitch and smoothly added to the signal stored in the buffer. This operation enables to obtain the signal that has undergone the concealment process in FIG. 13.

ITU-T Recommendation G.711—Appendix I defines procedures of audio communication and therefore considers packet loss and concealment thereof. In the image capture apparatus 1, the above-described PLC process 44e can directly be applied by regarding the packet loss timing as the mechanical driving noise generation timing. The term "PLC" is derived from "packet loss". Hence, to be precise, the concealment process based on the mechanical driving noise generation timing cannot be called PLC. In this specification, however, the description will be made calling the process applied to the image capture apparatus "PLC process" in a sense that a process similar to PLC is performed. More specifically, the camera system control circuit 25 instructs the audio signal processing circuit 26 to perform the PLC process 44e by an appropriate communication method at a timing noise may be generated.

The PLC is a method of appropriately copying a neighboring signal while referring to the neighboring signal, as described above. As a feature of this method, the noise level poses no problem because the audio signal at the time of noise generation is discarded when copying. As another feature, the PLC process period is suitably as short as possible.

Figure 6A:
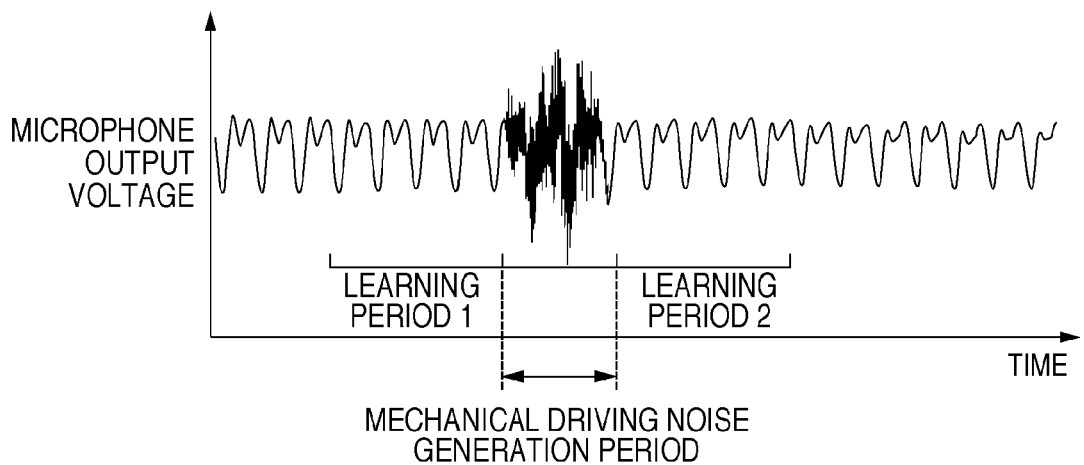
FIGS. 6A to 6C are explanatory views of an LPC process.
Figure 6B:
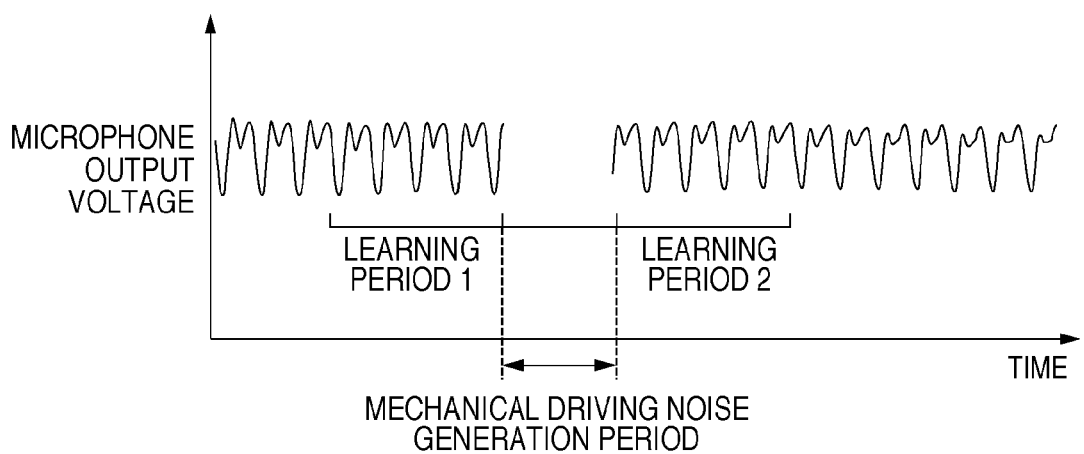
Figure 6C:
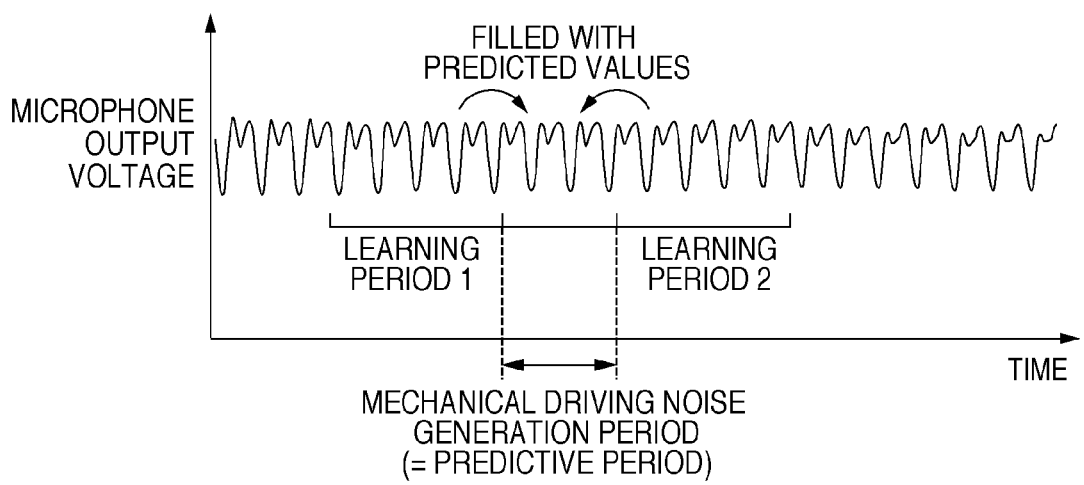

The LPC process 44f will be described next with reference to FIGS. 6A to 6C. Referring to FIGS. 6A to 6C, the abscissa represents time, and the ordinate represents the output voltage of the microphone 7. FIG. 6A shows the audio signal before the process. FIG. 6B shows the audio signal during the LPC process of the signal in FIG. 6A. FIG. 6C shows the audio signal after the LPC process of the signal in FIG. 6A.

In the LPC process 44f, first, the signal in the period shown in FIG. 6B where the mechanical driving noise exists is discarded. Next, a learning operation and a predictive operation are performed, as will be described later. The period (=predictive period) where noise exists is filled with the signal obtained by the predictive operation (see FIG. 6C).

As a feature of the LPC process 44f, a signal is generated by prediction from the learning periods before and after the predictive period where the signal is discarded. Hence, as features, the noise level poses no problem, and the predictive period is suitably as short as possible from the viewpoint of performance, like the PLC process 44e.

Derivation (learning operation) of a linear prediction coefficient and prediction (predictive operation) of a signal using the linear prediction coefficient, which are to be used for audio prediction of this embodiment, will be described here.

When using linear prediction, a linear combination relationship represented by $$x_t + \alpha_1 x_{t-1} + \ldots + \alpha_p x_{t-p} = \epsilon_t \quad (9)$$

is assumed between the current signal and a finite number of (let p be the number) sample values adjacent to the current signal, where $\epsilon_t$ is the random variable with an average value 0 and a variance $\sigma^2$ which are uncorrelated to each other. When equation (9) is rewritten to predict $x_t$ from the past values, we obtain $$x_t = x'_t + \epsilon_t = -\alpha_1 x_{t-1} - \ldots - \alpha_p x_{t-p} + \epsilon_t = -\sum_{i=1}^{p} \alpha_i x_{t-i} + \epsilon_t \quad (10)$$

where $x'_t$ is the estimated value of $x_t$. According to equation (10), when $\epsilon_t$ is sufficiently small, the current value is expressed by the linear sum of p neighboring values. After $x_t$ has been obtained by the above-described prediction, $x_{t+1}$ can also be obtained by the linear sum of p neighboring values if the approximation is sufficiently good. If $\epsilon_t$ can be made sufficiently small, the value can sequentially be predicted to obtain the signal. How to obtain $\alpha_i$ that minimizes $\epsilon_t$ will be examined. In this embodiment, the operation of obtaining $\alpha_i$ that minimizes $\epsilon_t$ will be referred to as a learning operation.

The sum square of $\epsilon_t$ is minimized in the above-described learning period. Letting $t_0$ be the learning start time, and $t_1$ be the end time, $$\sum_{t=t_0}^{t_1} \epsilon_t^2 = \sum_{t=t_0}^{t_1} \left( \sum_{i=0}^{p} \alpha_i x_{t-i} \right)^2 = \sum_{t=t_0}^{t_1} \sum_{i=0}^{p} \sum_{j=0}^{p} \alpha_i \alpha_j x_{t-i} x_{t-j} \quad (11)$$

where $\alpha_0 = 1$. To simplify the equation, let $$c_{ij} = \sum_{t=t_0}^{t_1} x_{t-i} x_{t-j} \quad (12)$$

To determine $\alpha_i$ that minimizes equation (11), it is solved by letting the partial differential with respect to $\alpha_j$ (j=1, 2, ..., p) of equation (11) be 0.

$$\frac{\partial}{\partial \alpha_i} \sum_{t=t_0}^{t_1} \epsilon_t^2 = \frac{\partial}{\partial \alpha_i} \left( \sum_{i=0}^{p} \sum_{j=0}^{p} \alpha_i c_{ij} \alpha_j \right) = 2 \sum_{i=0}^{p} \alpha_i c_{ij} = 0 \quad (13)$$

Equation (13) indicates that $\alpha_i$ can be determined by solving p simultaneous linear equations. Of equation (5), $c_{ij}$ can be obtained from $x_{t-1}$ (i=1, 2, ..., p). That is, $\alpha_i$ can be obtained from equation (13).

When $\alpha_i$ is determined in accordance with equation (13), the sum square of $\epsilon_t$ is minimized. At this time, the value $x_t$ can satisfactorily be approximated by the value $x'_t$ based on equation (10). If the approximation is sufficiently good, $x'_t$ can be used as a predictive signal in place of $x_t$. The approximate value of $x_{t+1}$ can also be obtained from a signal obtained by (p-1) neighboring values and prediction. Sequentially repeating this operation enables to generate the signal in the predictive period. In this embodiment, the operation of obtaining the approximation in the predictive period from the obtained value $\alpha_i$ will be referred to as a predictive operation.

Suitable learning operation and predictive operation will be described. As shown in FIGS. 6A to 6C, to perform the learning operation, signals near the predictive period are used. This uses the characteristics of the audio signal representing that the repeatability is relatively high in a short range. As shown in FIGS. 6A to 6C, learning period 1 is provided before the period where the noise exists, and learning period 2 is provided after the period where the noise exists. In the learning operation and the predictive operation, calculations are independently performed for the signals in learning periods 1 and 2. Generating the signal in the predictive period after the learning operation in learning period 1 will be referred to as forward prediction. Generating the signal in the predictive period after the learning operation in learning period 2 will be referred to as backward prediction. The signal in the predictive period is obtained by assigning a large weight to the value of forward prediction in a portion close to learning period 1 and assigning a large weight to the value of backward prediction in a portion close to learning period 2.

The above-described PLC process 44e and LPC process 44f are predictive processes. As described above, these processes commonly feature discard of the audio signal at the time of noise generation, insusceptibility to the noise level, and advantage in a short period. The present invention places focus on these features. An audio process that takes advantage of the features of the predictive process will be described below in detail. Note that the terms "PLC" and "LPC" are not formal and are used only for the sake of convenience in this specification.

A noise source of interest of this embodiment will be described first. The first example of the noise source is the stop driving circuit 9c shown in FIG. 2. The stop driving circuit 9c is provided in the lens 2 so as to make its reference line match the optical axis 4. When power is applied to the driving source (not shown), the stop driving circuit 9c performs the stop-down operation of making the diaphragm blades enter the optical path.

When the diaphragm blades are outside the optical path (full-aperture state), the light beam is regulated by a portion other than the diaphragm blades. On the other hand, when the diaphragm blades enter the optical path (stopped-down state), the light beam is regulated by the diaphragm blades.

The driving source is a stepping motor which can relatively easily implement positioning by appropriately controlling the excitation state. That is, the diaphragm blade entry amount to the optical path can be adjusted by appropriate control. This allows the light amount in the image sensor 6 to be adjusted.

Next, sound generated by the stop driving circuit 9c serving as a noise source will be explained. The above-described stop-down operation is performed in a relatively short time. The time is, for example, about 20 to 40 ms. Such a high operation speed is necessary for shortening the time lag from release to exposure and improving the continuous shooting speed. On the other hand, noise generated by the stop-down operation includes sound of collision between gears and sound of the diaphragm blades rubbing against each other. That is, noise in a wide band is generated.

The second example of the noise source is the click sensation generation unit of the operation button 31. The click sensation generation unit has a wheel. The wheel integrated with the operation button 31 and the like rotates about the rotation center in accordance with the user operation. At this time, the projection on the wheel presses the ball. Hence, the user senses a force upon rotation and also gets a feel of "click" when the ball drops in the groove portion of the projection. When the projection shape and the like are appropriately designed, the so-called click sensation is generated.

Sound generated by the click sensation generation unit serving as a noise source will be explained next. Since collision occurs as the ball drops from the ridge to the groove of the projection, noise in a wide band is generated in a short time.

As a feature of the above-described noise, it is short-time wide-band noise. The present invention is applicable to any noise other than the above-described two examples if the noise has such a feature. In addition, the short-time wide-band noise is compatible with the predictive process, as described above. It is therefore possible to appropriately perform the predictive process.

Figure 7A:
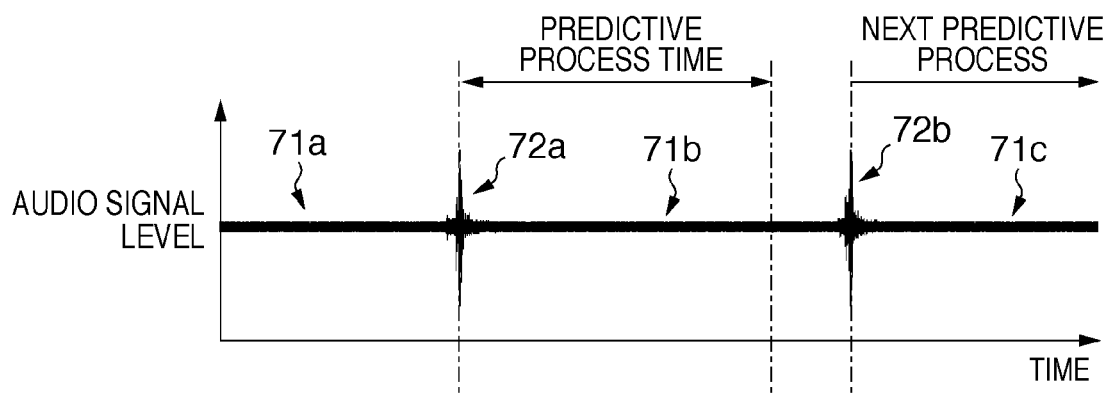
FIGS. 7A to 7C are explanatory views of a predictive process.
Figure 7B:
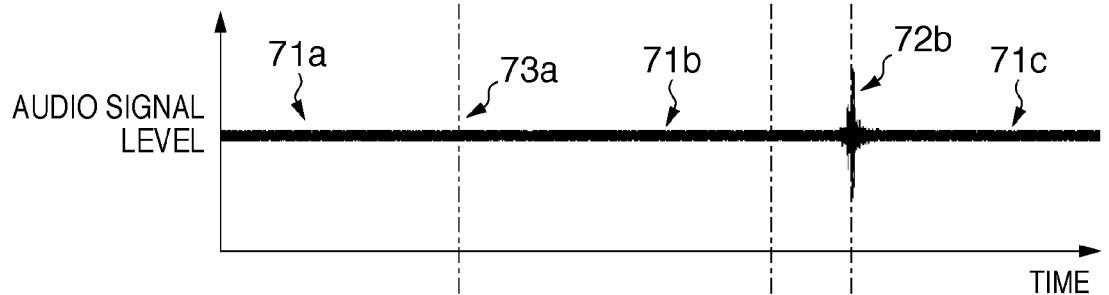
Figure 7C:
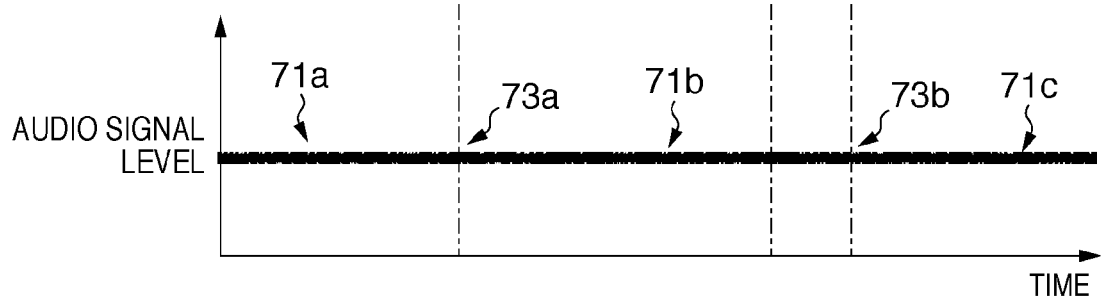

FIGS. 7A to 7C show the relationship between the short-time wide-band noise and the predictive process time. Referring to FIGS. 7A to 7C, the abscissa represents time, and the ordinate represents the audio signal level. Reference numerals 71a, 71b, and 71c denote audio signals in the period where only object sound or dark noise exists; 72a and 72b, audio signals in the period where noise is generated; and 73a and 73b, audio signals after the predictive process. In FIGS. 7A to 7C, the audio signals 72a and 72b containing noise are present at two portions. FIG. 7A shows a signal acquired by the microphone 7, FIG. 7B shows an audio signal after the audio signal 72a containing the first noise has been processed, and FIG. 7C shows an audio signal after the audio signal 72b containing the second noise has been processed.

The first noise reduction unit requires a predetermined process time for the predictive process, as described concerning the PLC process 44e and the LPC process 44f. This time is represented by the predictive process time in FIGS. 7A to 7C. In the example of FIGS. 7A to 7C, since the time from the process of the audio signal 72a containing the first noise to the process of the audio signal 72b containing the second noise is longer than the predictive process time, the predictive process is appropriately executed. The audio signal 72a containing the first noise is appropriately processed to the audio signal 73a after the predictive process. The audio signal 72b containing the second noise is appropriately processed to the audio signal 73b after the predictive process. The audio signals 71a, 71b, and 71c in the period where only object sound or dark noise exists need not particularly be processed and are directly output. Eventually, an audio signal that has undergone appropriate noise reduction is obtained, as shown in FIG. 7C.

Figure 8A:
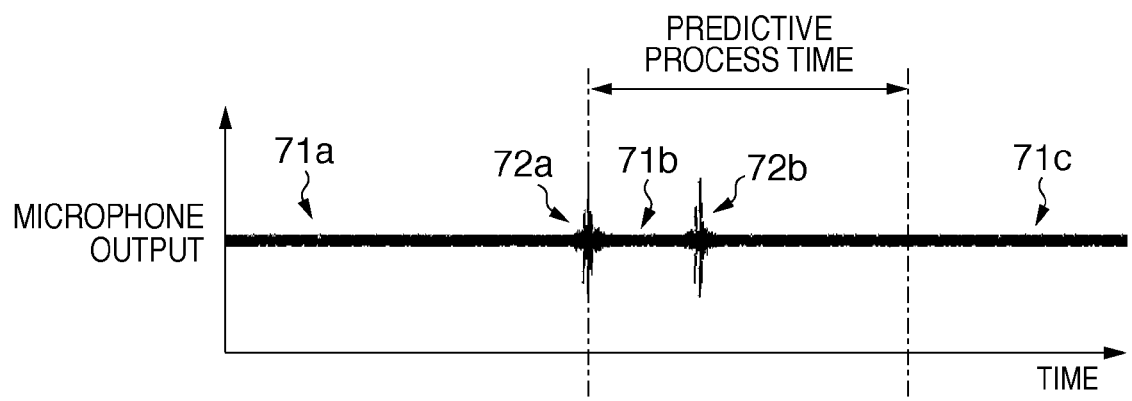
FIGS. 8A and 8B are explanatory views of a predictive process for noise in the vicinity.
Figure 8B:
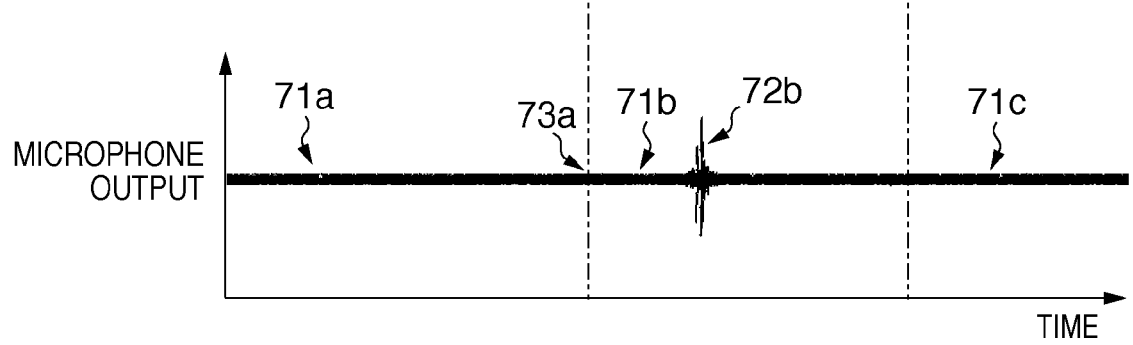

A scene where the problem of interest of the present invention arises will be described next with reference to FIGS. 8A and 8B. FIGS. 8A and 8B show an example in which the audio signals 72a and 72b containing noise are present at two portions, as in FIGS. 7A to 7C. In FIGS. 8A and 8B, the same reference numerals as in FIGS. 7A to 7C denote the same signals, the abscissa represents time, and the ordinate represents the audio signal level. FIG. 8A shows a signal acquired by the microphone 7, and FIG. 8B shows an audio signal after the audio signal 72a containing the first noise has been processed.

In the example of FIGS. 8A and 8B, the time from the process of the audio signal 72a containing the first noise to the process of the audio signal 72b containing the second noise is shorter than the predictive process time. That is, if two or more of a plurality of driving units are driven without ensuring an interval longer than or equal to a predetermined period, the audio signal 72b containing the second noise is not appropriately processed. As a result, the second noise 72b is not reduced, as shown in FIG. 8B. In addition, if the second noise is included in the learning period necessary for the predictive process, the predictive process for the first noise is executed by replacing the signal with an audio influenced by the second noise.

When the audio signal explained with reference to FIGS. 8A and 8B is used to, for example, reproduce a moving image on a monitor that is connected, via a cable, to the image capture apparatus 1 serving as a reproduction apparatus, the noise 72b affects the object sound, resulting in poorer audio quality. That is, the quality of the reproduced audio may degrade.

The gist of the present invention will be described with reference to FIGS. 9A to 9C and 12A to 12C. The following description will be made by exemplifying the filter process 44b and the mute process 44c as the second noise reduction unit. However, the SS process 44a, the sound pressure process 44d, and the like may be used singly or in combination.

Figure 9A:
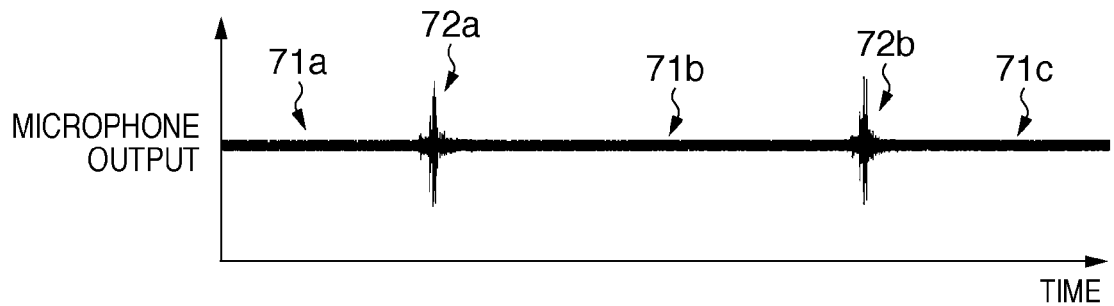
FIGS. 9A to 9C are graphs showing noise and a filter characteristic.
Figure 9B:
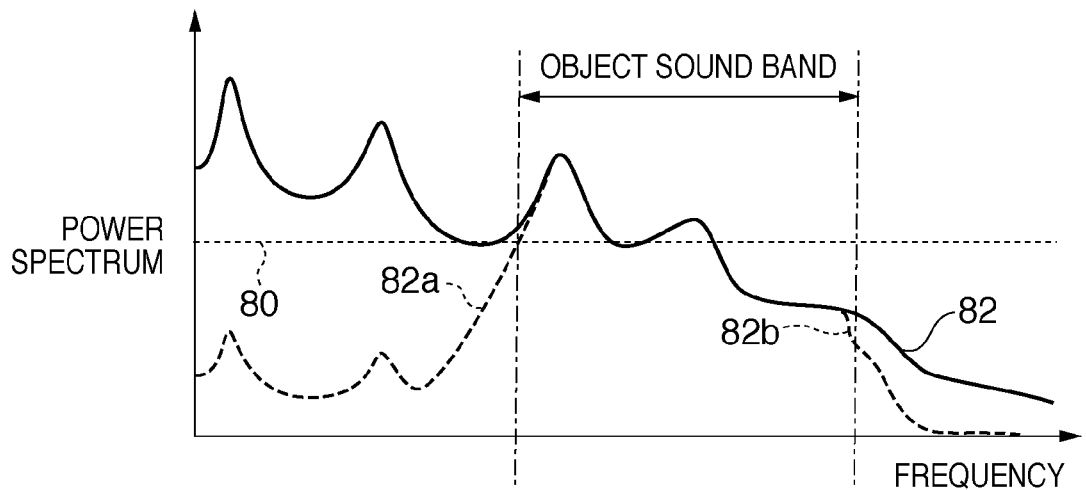
Figure 9C:
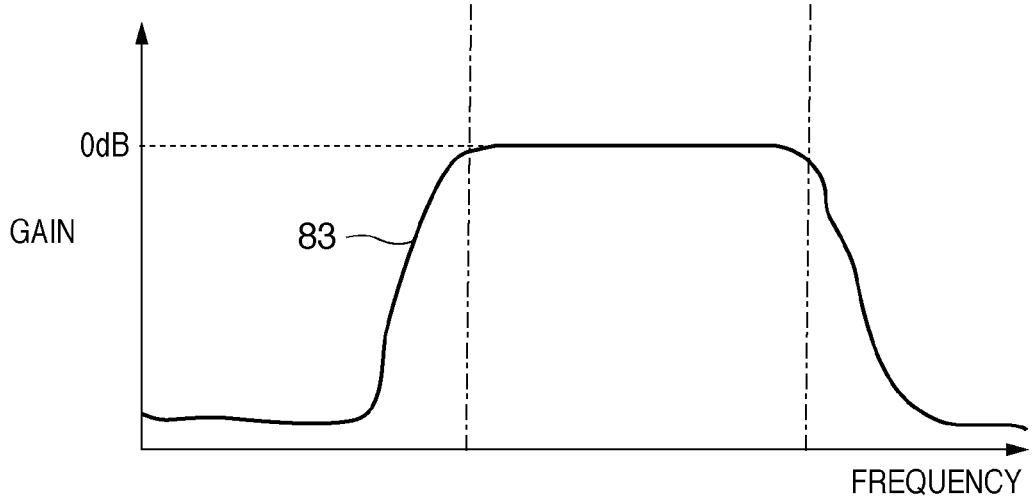

FIGS. 9A to 9C are graphs for explaining the noise spectrum and the filter characteristic. The same reference numerals as in FIGS. 7A to 7C denote the same signals in FIGS. 9A to 9C. In FIG. 9A, the abscissa represents time, and the ordinate represents the microphone output. In FIG. 9B, the abscissa represents the frequency, and the ordinate represents the power spectrum. In FIG. 9C, the abscissa represents the frequency, and the ordinate represents the filter gain. The abscissas of FIGS. 9B and 9C match each other. The alternate long and short dashed lines running through FIGS. 9B and 9C indicate the same frequencies. In FIG. 9B, reference numeral 80 denotes an object sound level; 82, a power spectrum of the audio signals 72a and 72b containing noise; and 82a and 82b, power spectra after filter application. The frequency band where the object sound mainly exists is shown as an object sound band. In FIG. 9C, reference numeral 83 denotes a filter characteristic. Noise explained as the first or second example is wide-band noise and therefore has a high power spectrum in a wide region including the object sound band. In the example of FIGS. 9A to 9C, the noise has high power especially on the low frequency side. However, the noise may have high power on the high frequency side.

As schematically shown in FIG. 9C, the filter process 44b is designed to pass the object sound band (=0 dB) and cut off the remaining bands (=low gain). The audio signals 72a and 72b containing noise change to the power spectra 82a and 82b in FIG. 9B by applying the above-described filter. In the object sound band, the power spectrum matches the power spectrum 82 before filter application because the filter characteristic is 0 dB. As a result, the mechanical driving noise component is cut off not in the object sound band but in the remaining bands. This means that the mechanical driving noise component can be reduced, though incompletely.

Figure 10:
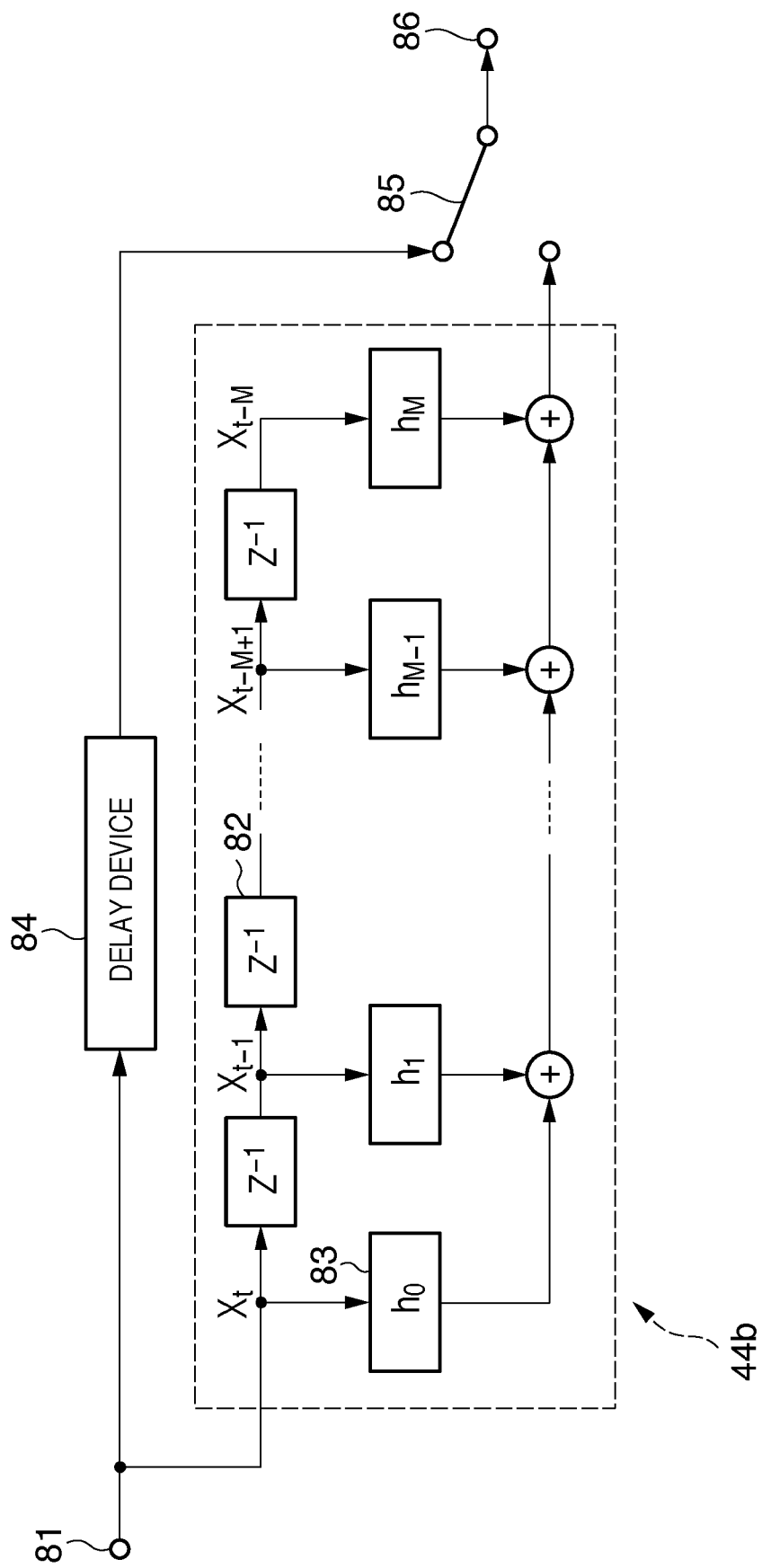
FIG. 10 is a block diagram of a filter processing circuit.

FIG. 10 illustrates the detailed arrangement of the filter process 44b, which is formed from a filter called a transversal filter. Referring to FIG. 10, reference numeral 81 denotes an input unit; 82, a unit delay device; 83, a filter coefficient holding unit; 84, a delay device; 85, a switch; and 86, an output unit. As can be seen, the circuit shown in FIG. 10 performs convolution integral represented by equation (7) (f(t) of equation (7) corresponds to h in FIG. 10). That is, a signal input to the input unit 81 is appropriately filtered by the filter process 44b. On the other hand, the delay device 84 applies a delay equivalent to the filter process 44b to the signal. The delay by the filter process 44b changes depending on the filter coefficient. In general, the delay is approximately ½ the filter order.

The switch 85 is connected in synchronism with noise generation. The example of FIG. 10 indicates a case in which no noise is generated. At this time, a signal is obtained by simply delaying the signal input to the input unit 81. When noise is generated, the switch 85 is connected to the output side of the filter process 44b. At this time, a signal is obtained by filtering the signal input to the input unit 81. As a result, the output unit 86 can obtain an appropriately filtered signal.

The filter as shown in FIG. 10 can easily be implemented by hardware and perform a real-time process. That is, although the effect is limited, as described with reference to FIGS. 9A to 9C, the process time is much shorter than that of the predictive process. This feature is used.

Figure 11A:
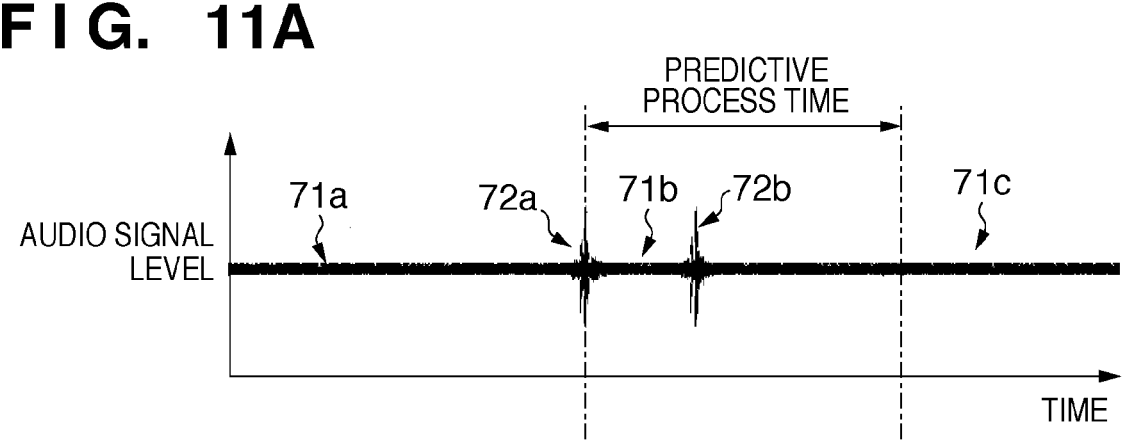
FIGS. 11A to 11C are explanatory views of a filter process.
Figure 11B:
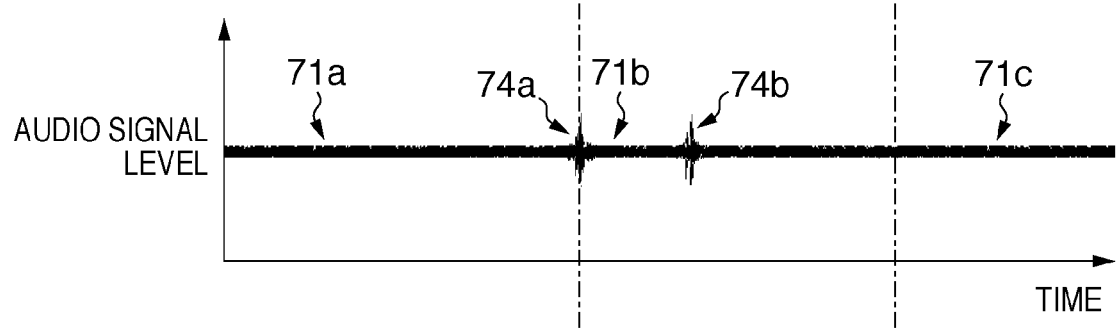
Figure 11C:
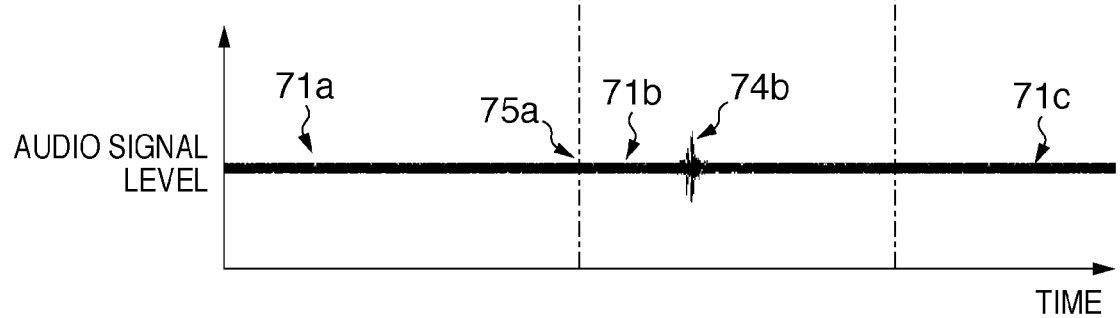

Noise reduction by the filter process 44b will be described next with reference to FIG. 11A to 11C. In FIGS. 11A to 11C, the same reference numerals as in FIGS. 7A to 7C denote the same signals, the abscissa represents time, and the ordinate represents the audio signal level. Reference numerals 74a and 74b denote audio signals that have undergone the filter process; and 75a, an audio signal that has undergone the predictive process after the filter process. FIG. 11A shows a signal acquired by the microphone 7, FIG. 11B shows a signal that has undergone the filter process, and FIG. 11C shows an audio signal obtained by performing the predictive process for the audio signal 74a after the first filter process.

The example of FIGS. 11A to 11C assumes a case in which the time from the process of the audio signal 72a containing the first noise to the process of the audio signal 72b containing the second noise is shorter than the predictive process time, like the example shown in FIGS. 8A and 8B.

The audio signal processing apparatus according to this embodiment operates the filter process 44b serving as the second noise reduction unit in synchronism with noise generation. As a consequence, the audio signals 72a and 72b containing noise change to the audio signals 74a and 74b that have undergone the filter process. As described with reference to FIGS. 9A to 9C, applying the filter allows a reduction in the mechanical driving noise component to some degree. This is schematically indicated by the amplitude in FIG. 11B.

Next, the predictive process is performed for the filtered audio signal 74a that exists at the preceding stage. The predictive process discards the original audio signal and therefore has no influence even when the filter process is executed (that is, no adverse effect is generated).

In the example of FIGS. 11A to 11C, the time from the process of the audio signal 74a to the process of the audio signal 74b is shorter than the predictive process time. The predictive process is not performed for the portion of the audio signal 74b. As a result, the signal shown in FIG. 11C is recorded. However, the mechanical driving noise component can be reduced as compared to the example of FIGS. 8A and 8B because the audio signal 72b containing the second noise has been filtered. When a moving image is reproduced using the above-described image capture apparatus 1 as the reproduction apparatus, the influence of the noise 72b is reduced so that the audio quality improves.

As another example, if a portion where the predictive process is not performed occurs, as in FIGS. 17A to 17C, the information may be recorded in a predetermined region. In this case, the predictive process can be executed asynchronously with the image capture (at an appropriate timing after image capture). The process may be done in the image capture apparatus 1 at an appropriate timing.

The image capture apparatus 1 may be connected to a personal computer (PC) via a cable, and a moving image and the above-described information may be sent and processed by appropriate application software. This allows higher-quality audio to be obtained.

The mute process 44c has a very simple arrangement that includes the input unit 81, the switch 85, and the output unit 86 shown in FIG. 10 to only change a signal to zero level. This enables a real-time process.

Figure 12A:
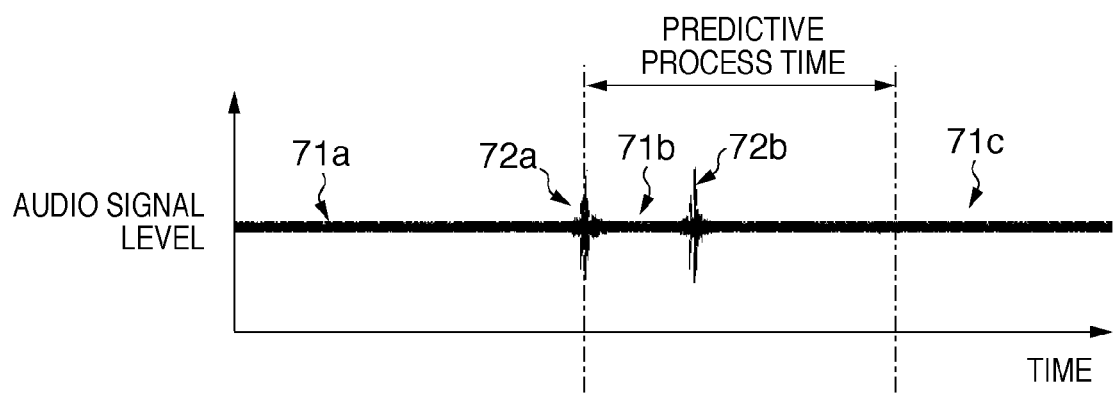
FIGS. 12A to 12C are explanatory views of a mute process.
Figure 12B:
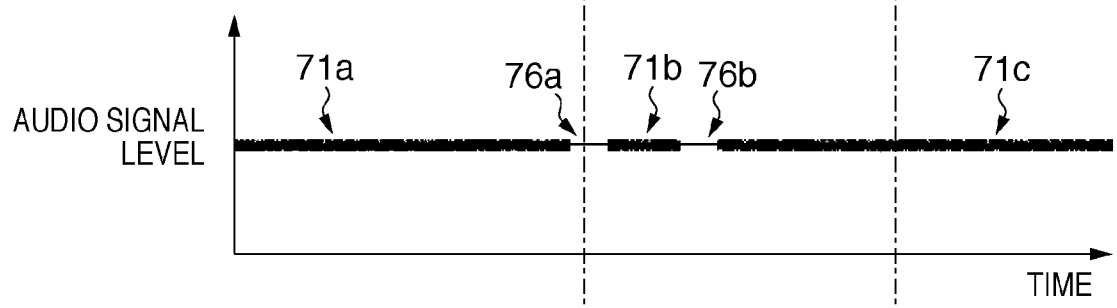
Figure 12C:
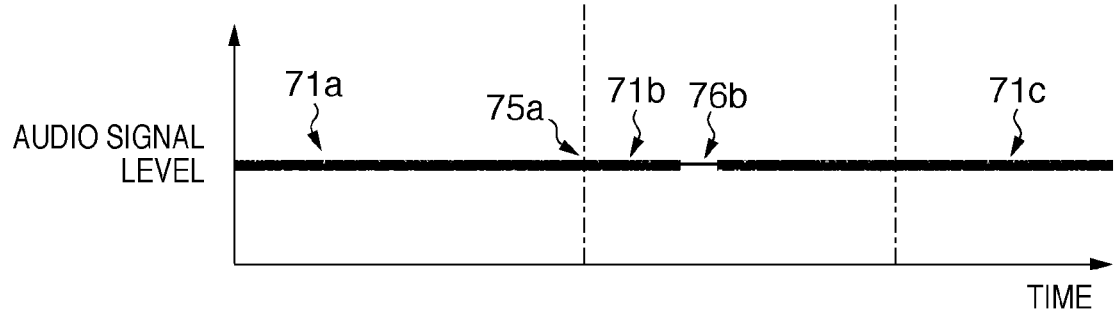

Noise reduction by the mute process 44c will be described next with reference to FIG. 12A to 12C. In FIGS. 12A to 12C, the same reference numerals as in FIGS. 7A to 7C denote the same signals, the abscissa represents time, and the ordinate represents the audio signal level. Reference numerals 76a and 76b denote audio signals that have undergone the mute process; and 75a, the audio signal that has undergone the predictive process after the mute process. FIG. 12A shows a signal acquired by the microphone 7, FIG. 12B shows a signal that has undergone the mute process, and FIG. 12C shows an audio signal obtained by performing the predictive process for the audio signal 76a after the first mute process.

In the mute process, the mechanical driving noise can completely be removed, as a matter of course. On the other hand, the object sound is also completely removed. If the object sound is small, an appropriate audio can be obtained by removing the mechanical driving noise by the mute process. If the object sound is large, it breaks to give a sense of incongruity. The effect of the mute process is limited because the scene where an appropriate process can be done is limited.

In the example of FIGS. 12A to 12C as well, the same effect as in the case of FIGS. 11A to 11C can be obtained by applying the present invention. That is, when performing the predictive process, a process other than the predictive process is executed, before the predictive process, for noise unremovable by the predictive process, thereby appropriately reducing noise.

In FIGS. 12A to 12C as well, the audio signal after the predictive process is represented by 75a, as in FIGS. 11A to 11C. This indicates that the same signal is generated without the influence of the signal that has undergone the mute process or the filter process.

As described above, when the audio signal to be used to calculate the predictive signal in the predictive process includes a signal largely affected by noise, the influence of noise becomes manifest in the predictive signal itself. However, when noise reduction is executed to some extent in advance for the audio signals in the periods ("learning periods") before and after the noise period adjacently with respect to the noise period to be used to calculate the predictive signal, noise reduction can be done while reducing the influence of noise on the predictive signal.

Especially, when the second noise reduction unit (SS process, filter process, mute process, and sound pressure process) is executed, and after that, the first noise reduction unit (PLC process and LPC process) by the predictive process is executed so as to include the first noise period, the noise can effectively be reduced while reducing the operation load.

Second Embodiment

The second embodiment will be described next. A noise reduction unit 44 of this embodiment includes, out of the arrangement shown in FIG. 3, an SS process 44a, a filter process 44b, a PLC process 44e, and an LPC process 44f, and their operations and functions are the same as those described above.

The noise generation mechanism of this embodiment will be explained below. A shake correction driving circuit 9b serving as a noise source has a correction optical system (lens) drivable in biaxial directions. The shake correction driving circuit 9b corrects the camera shake by causing a driving unit (coil) to decenter the correction optical system in accordance with the detection signal from a shake sensor 14. Without current supply to the coil, the correction optical system of the shake correction driving circuit 9b decenters in the direction of gravity. When the user looks in the optical viewfinder in this state, a poor-quality image is observed. To prevent this, the correction optical system is suitably held on the optical axis when camera shake correction is not performed. In a portable device such as a camera, however, it is difficult to always hold the correction optical system on the optical axis because power saving is needed.

To solve this problem, a lock mechanism including a photo interrupter and the like is provided in the shake correction driving circuit 9b. A lock state can be detected when the signal to the photo interrupter is cut. In the lock state, the correction optical system is held almost on the optical axis. To shift the lock state to an unlock state, the stepping motor is rotated from the lock position by a predetermined amount in a predetermined direction. In the unlock state, the shake correction driving circuit 9b can operate the correction optical system to correct camera shake.

Sound generated by the shake correction driving circuit 9b serving as a noise source will be described. When the above-described lock mechanism transits between the lock state and the unlock state, large sound is generated in a short time. On the other hand, during the shake correction operation, small sound is steadily generated in accordance with shake correction driving.

Figure 14A:
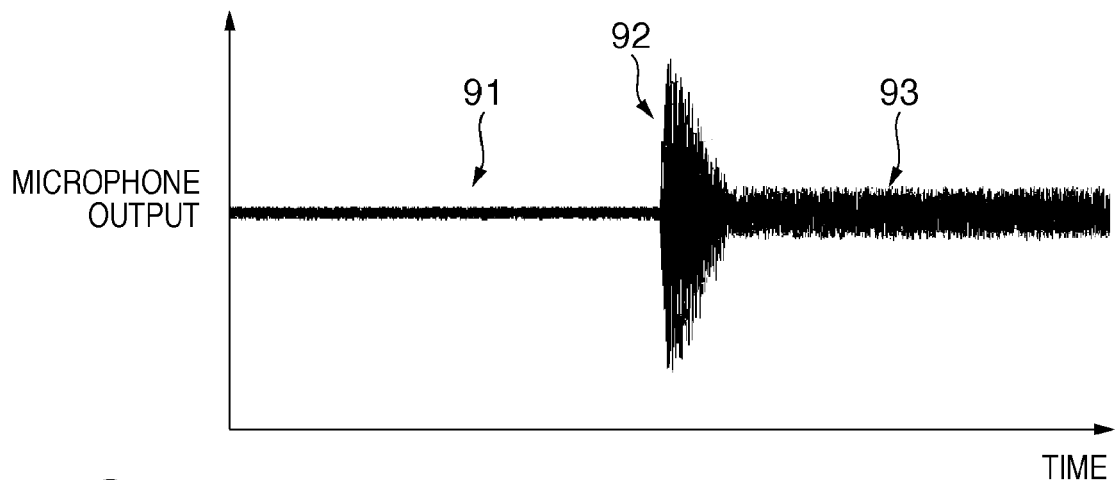
FIGS. 14A and 14B are graphs showing sound generated by a shake correction driving circuit.
Figure 14B:
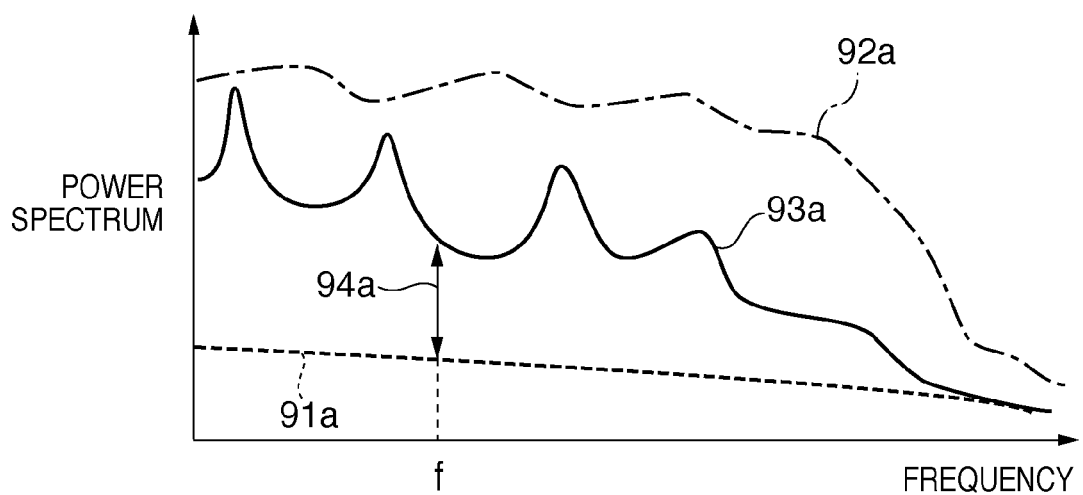

FIGS. 14A and 14B show audio signals generated by the shake correction driving circuit 9b. In FIG. 14A, the abscissa represents time, and the ordinate represents the output of a microphone 7. FIG. 14B shows the Fourier transform result of the audio signals in several periods in FIG. 14A. The abscissa represents the frequency, and the ordinate represents the power spectrum. Referring to FIG. 14A, reference numeral 91 denotes a so-called dark noise period; 92, operation sound of the lock mechanism; and 93, stationary sound in shake correction. Referring to FIG. 14B, reference numerals 91a, 92a, and 93a denote Fourier transform results of the portions 91, 92, and 93, respectively; and 94a, a difference between the signals 93a and 91a at a frequency f [Hz]. In the dark noise period 91, the audio signal level is low, and the power spectrum 91a is also smaller than those in the remaining periods. In the period 92 including the operation sound of the lock mechanism, large first noise (first driving noise component) is generated in a short time. In addition, noise is generated in a wide frequency band because of occurrence of collision and the like. For this reason, the power spectrum 92a exhibits a large value in a wide range. In the shake correction period 93, stationary second noise (second driving noise component) is generated, which lasts longer than the first noise. Furthermore, noise in a specific frequency band corresponding to the type of the shake correction driving circuit 9b becomes large. For this reason, the power spectrum 93a has several peaks.

In FIGS. 14A and 14B, when the SS method is applied, the difference 94a between the power spectrum 93a in the shake correction period and the power spectrum 91a of the dark noise is stored in correspondence with each frequency. In the SS process, a camera system control circuit 25 gives the stored power spectrum difference 94a, as described above.

Figure 15:
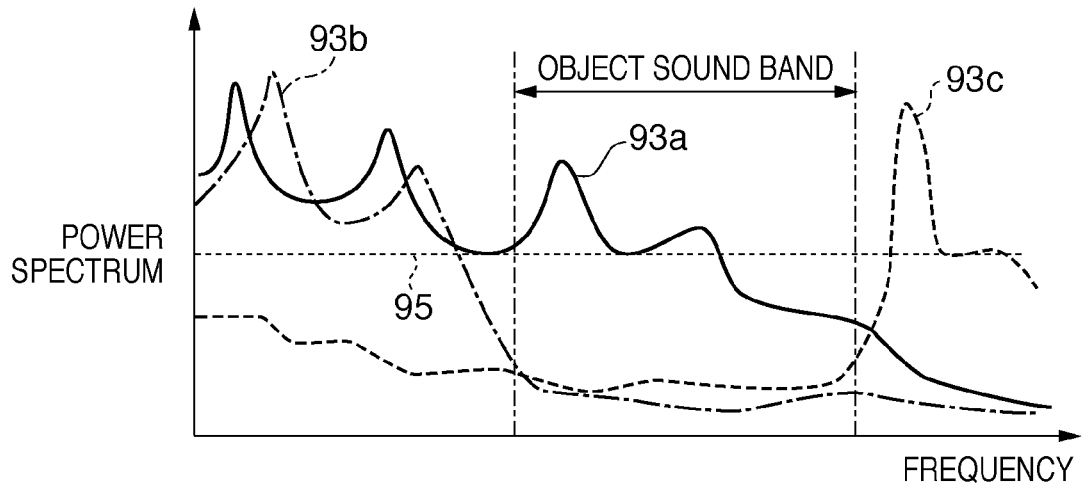
FIG. 15 is a view showing the lens types and the features of noise.

The lens types, the features of noise, and the noise reduction technique selection method will be described with reference to FIG. 15. FIG. 15 shows the Fourier transform result of noise during shake correction using several lenses. The abscissa represents the frequency, and the ordinate represents the power spectrum. The object sound is assumed to have the main component in an appropriate band, as shown in FIG. 15 (FIG. 15 shows the band as an object sound band). In FIG. 15, reference numerals 93a, 93b, and 93c denote power spectra of different lenses; and 95, an object sound level.

Assume that the shake correction driving circuit 9b generates noise having the power spectrum 93a. In the object sound band, the power spectrum 93a of noise of the shake correction driving circuit 9b has a level so higher than the object sound level 95 that it affects the object sound. A filter separates the noise from the object sound by band. Hence, a process using a filter is difficult in this case.

On the other hand, assume that the shake correction driving circuit 9b generates noise having the power spectrum 93b or 93c. Outside the object sound band, the power spectrum 93b or 93c of noise of the shake correction driving circuit 9b partially has a level higher than the object sound level 95 that it affects the object sound. However, the object sound is supposed to be dominant in the object sound band. In this case, a process using a filter is suitable.

More specifically, an appropriate high-pass filter is used when the noise 93b is generated, and an appropriate low-pass filter is used when the noise 93c is generated. This is equivalent to setting a filter that satisfies expressions (5) and (6). In the filter process, the spectrum of the noise source is estimated in advance, and the camera system control circuit 25 gives an appropriate filter, as described above.

The SS process 44a may distort the object sound but is applicable to noise that is hard to separate by band. On the other hand, if noise can be separated by band, the filter process 44b can reduce the noise while decreasing the influence on the object sound. That is, the SS process 44a and the filter process 44b are selectively used as needed while placing focus on the power spectrum of the noise source.

The SS process 44a and the filter process 44b have been described using the angular velocity ω. The abscissa of FIGS. 14A, 14B, and 15 indicates the frequency, which can be converted by $2\pi f = \omega$ [rad/s].

The audio signal processing apparatus of the present invention and the image capture apparatus including the audio signal processing apparatus can use the filter process 44b or the SS process 44a as noise reduction of the preceding stage. A case will be described below in which the SS process 44a is used.

The problem of synchronization of the SS process start timing and a plurality of noise reduction processes will be described with reference to FIGS. 16A to 16D. Referring to FIGS. 16A to 16D, one cell indicates a cluster of audio signals in an appropriate time (for example, one cell corresponds to audio signals in 10 ms). The abscissa represents time. Explanatory legends are also illustrated in FIGS. 16A to 16D. Reference numeral 101 denotes an audio signal in the period where only the object sound or dark noise exists; 102, an audio signal in the period where unlock sound is generated; and 103, an audio signal in the period where shake correction driving noise is generated. These audio signals correspond to 91, 92, and 93 in FIGS. 14A and 14B. In FIGS. 16A to 16D, reference numeral 104 denotes an audio signal obtained by the SS process of the lock sound generation period; 105, an audio signal obtained by the SS process of the shake correction driving noise generation period; and 106, an audio signal obtained by the SS process of the period including only the object sound or dark noise. FIG. 16A shows the audio signal before the SS process. FIG. 16B shows the audio signal when the SS process starts in synchronism with the unlock timing. FIG. 16C shows the audio signal when the SS process starts before the unlock timing. FIG. 16D shows the audio signal when the SS process starts after the unlock timing.

Referring to FIG. 16B, the audio signal 105 obtained by the SS process of the shake correction driving noise generation period has appropriately undergone the SS process. Hence, noise in shake correction driving is appropriately reduced. On the other hand, the audio signal 104 obtained by the SS process of the lock sound generation period has high power in a wide band, although the lock sound generation time is short, as described in FIGS. 14A and 14B. For this reason, it is impossible to sufficiently reduce noise by the SS process using the power spectrum of the shake correction operation. In the example of FIGS. 14A and 14B, the difference between the power spectra 92a and 93a remains even after the SS process. This is because the SS process aims at reducing stationary noise, that is, noise generated by shake correction driving.

Referring to FIG. 16C, the audio signal 106 obtained by the SS process of the period including only the object sound or dark noise is distorted when the object sound exists. In the SS process, spectrum subtraction is performed using the estimated noise spectrum, like equation (3). However, oversubtraction is performed because the period of the audio signal 106 originally includes no noise. As a result, the object sound is distorted.

In FIG. 16D, the start portion of the lock sound remains without being processed. Generally, noise accompanying a collisional phenomenon exhibits an attenuated shape after generation of large sound, as in the example shown in FIGS. 14A and 14B. In this case, the large noise at the start portion is directly superimposed on the object sound.

If the SS process start timing and the noise generation timing can completely be synchronized, the audio signal shown in FIG. 16B can be obtained. However, since the image capture apparatus 1 adjusts the optical system by sending an instruction to the photographing lens 2 via the electrical contact 10, a delay occurs depending on the communication and interrupt timing and the like. For this reason, it is not easy to perform the SS process at a completely synchronized timing. If the SS process timing is out of synchronization, the object sound is distorted, or large noise is superimposed, as described with reference to FIGS. 16C and 16D.

The problems of the frames and the subtraction gain of the SS process will be described with reference to FIGS. 17A to 17C. Referring to FIGS. 17A to 17C, one cell indicates a cluster of audio signals in an appropriate time, as in FIGS. 16A to 16D. The abscissa represents time, and the same reference numerals as in FIGS. 14A and 14B denote the same signals. In FIGS. 17A to 17C, reference numeral 101a denotes an audio signal obtained by the SS process of the period including only the object sound or dark noise; and 105a and 107, audio signals obtained by the SS process of the shake correction driving noise generation period. The difference will be described later in detail. The vertical dotted lines of FIGS. 17A to 17C indicate the segments of signals to be simultaneously subjected to FFT in the SS process (to be referred as frames of SS process hereinafter). In the SS process, FFT, spectrum subtraction, and IFFT are performed, as described above. Since the number of data to be subjected to FFT needs to be a power of 2, the process is performed by segmenting the signals into appropriate frames. In the example of FIGS. 17A to 17C, three frames are used, which are called frame 1, frame 2, and frame 3 in chronological order.

FIG. 17A shows the audio signal before the SS process. FIG. 17B shows the audio signal when the SS process is executed to appropriately process the shake correction driving noise generation period 103. FIG. 17C shows the audio signal when the SS process is executed to appropriately process the period 91 including only the object sound or dark noise.

In the example of FIGS. 17A to 17C, frame 1 need not undergo the SS process. The SS process of frame 3 is executed after discriminating information added by the camera system control circuit 25 to indicate that the frame has not undergone the SS process yet. The problems are in the process of frame 2. The process of frame 2 and its problems will be described below.

In FIG. 17B, the SS process is executed to appropriately process the shake correction driving noise generation period 103. For this reason, the audio signal 105a obtained by the SS process of the shake correction driving noise generation period in frame 2 has appropriately undergone the SS process, and noise generated by shake correction driving is appropriately reduced. On the other hand, for the audio signal 106 obtained by the SS process of the period including only the object sound or dark noise, oversubtraction is performed, and the object sound is distorted, as in FIGS. 12A to 12C.

In FIG. 17C, the SS process is executed to appropriately process the period 101 including only the object sound or dark noise. For this reason, the audio signal 101a obtained by the SS process of the period including only the object sound or dark noise in frame 2 has appropriately undergone the process, and distortion of the object sound is small. On the other hand, for the audio signal 107 obtained by the SS process of the shake correction driving noise generation period, undersubtraction is performed, and the noise is not sufficiently reduced.

To solve this problem, Japanese Patent Laid-Open No. 2006-262241 proposes appropriately performing spectrum subtraction using the mixture ratio of noise in the noise period. However, it is not easy to accurately detect the noise generation timing. It is also difficult to accurately perform the SS process of an audio signal corresponding to 101a and 105a in FIGS. 17B and 17C even using the above-described mixture ratio (an intermediate result of the description of FIGS. 17A to 17C can only be obtained).

As described with reference to FIGS. 16A to 16D and 17A to 17C, when a plurality of noise components are generated, it is difficult to obtain a sufficient result, synchronize the noise reduction timing, and determine the intensity at the start of the process by one noise reduction process. The present invention attempts to solve these problems by using a plurality of different noise reduction methods and appropriately defining their order.

The gist of the present invention will be described with reference to FIGS. 6A to 6C and 16A to 19E.

Figure 18:
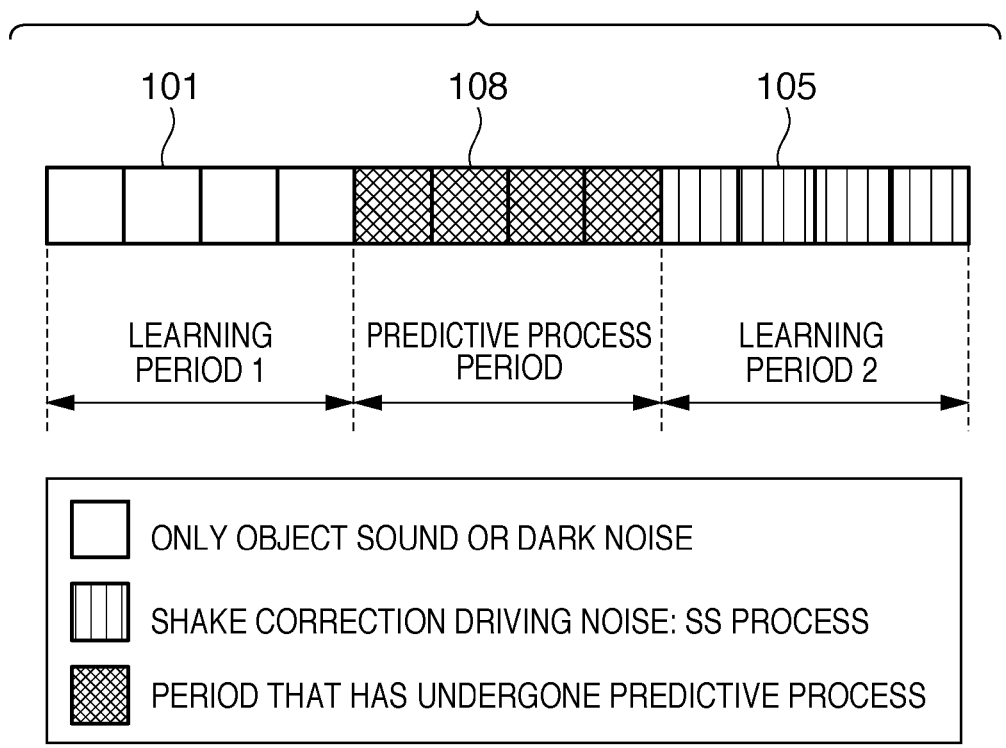
FIG. 18 is a view showing a case in which the predictive process is executed after the SS process.

According to this embodiment, the PLC process 44e or the LPC process 44f serving as the first noise reduction unit is executed after the SS process 44a or the filter process 44b serving as the second noise reduction unit. For example, when the SS process 44a is performed, audio signals as shown in FIGS. 16B to 16D or FIGS. 17B and 17C are obtained. FIG. 18 shows an example in which the predictive process is executed by setting a predictive period including the period that has undergone the SS process 44a. In FIG. 18, the same reference numerals as in FIGS. 16A to 16D and FIGS. 17A to 17C denote the same signals. Reference numeral 108 denotes an audio signal generated by prediction.

As described with reference to FIGS. 16A to 16D and FIGS. 17A to 17C, the audio signal 101 in the period where only the object sound or dark noise exists is not affected by the noise. For the audio signal 105 obtained by the SS process of the shake correction driving noise generation period, the noise is appropriately reduced. On the other hand, for the audio signal between these signals, the noise may not be sufficiently reduced (this applies to, for example, the audio signals 102 and 106 in FIGS. 16A to 16D or the audio signal 107 in FIGS. 17A to 17C). However, in the predictive process, the original signal is discarded, as shown in FIGS. 6A to 6C. For this reason, the audio signal whose noise may not be reduced is discarded. In addition, since the signal generated by the prediction is generated from the audio signals 101 and 105, the mechanical driving noise component can be reduced.

Figure 19A:
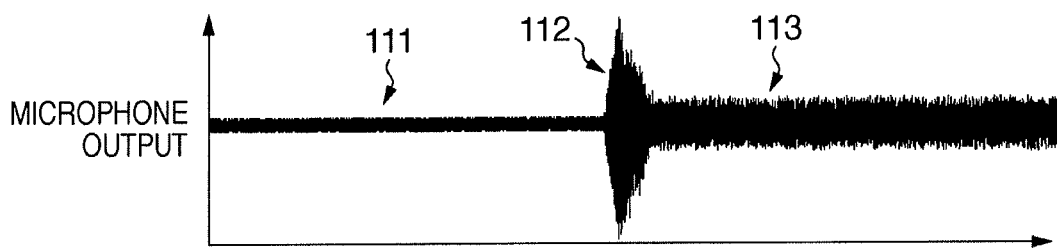
FIGS. 19A to 19E are timing charts showing audio signals by the SS process and the predictive process.
Figure 19B:
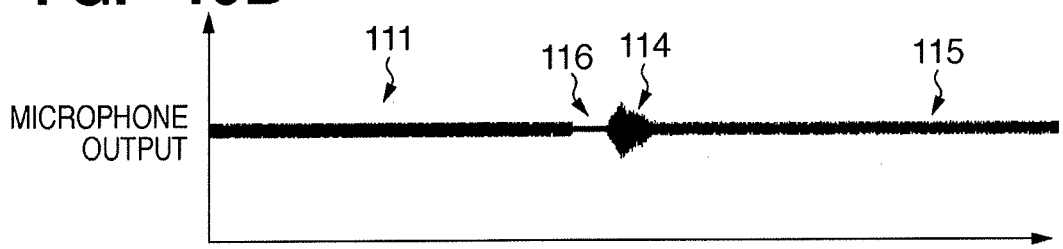
Figure 19C:
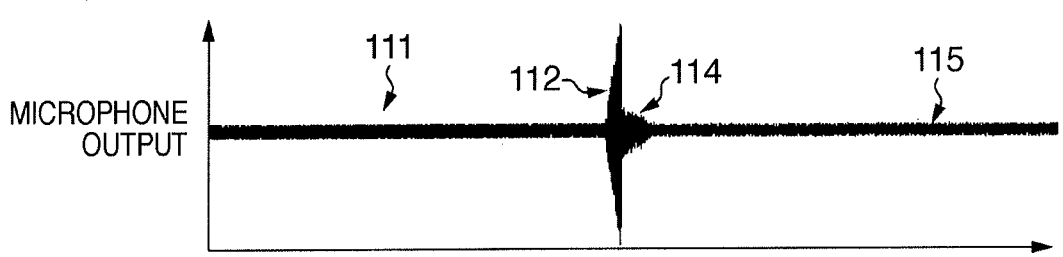
Figure 19D:
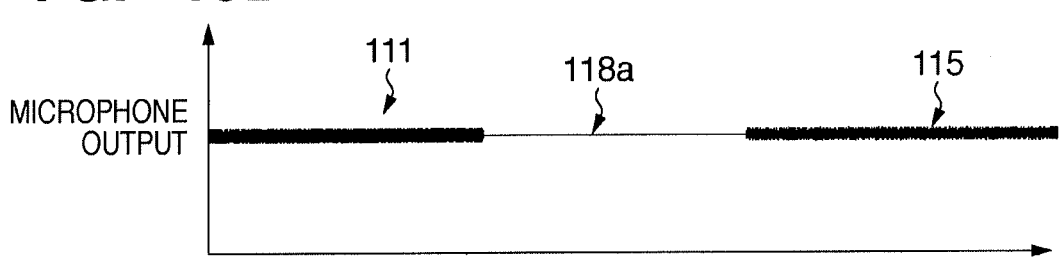
Figure 19E:
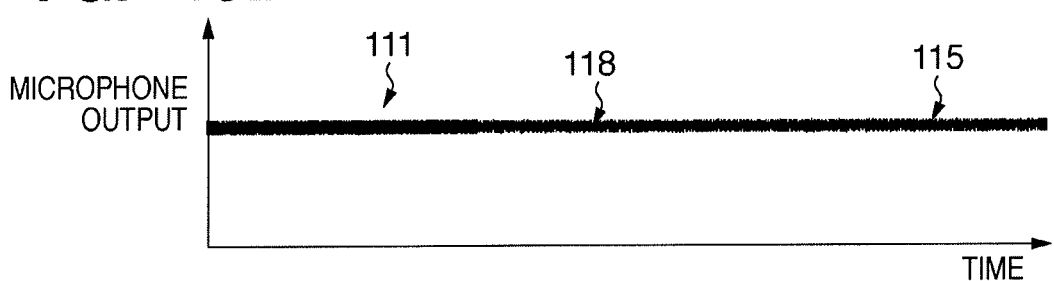

FIGS. 19A to 19E show the audio signals by the above-described SS process and predictive process. The abscissa represents time, and the ordinate represents the output of the microphone 7. FIG. 19A shows the audio signal before the process. FIG. 19B shows the audio signal that undergoes the SS process at a timing earlier than unlock. FIG. 19C shows the audio signal that undergoes the SS process at a timing later than unlock. FIG. 19D shows the audio signal during the predictive process. FIG. 19E shows the audio signal after the predictive process. FIGS. 19A to 19E illustrate the waveforms when no object sound exists so as to clarify the state of noise. The processing method and effects do not change even if the object sound exists.

Referring to FIGS. 19A to 19E, reference numeral 111 denotes an audio signal in the period where only the object sound or dark noise exists; 112, an audio signal in the period where unlock sound is generated; 113, an audio signal in the period where shake correction driving noise is generated; 114, an audio signal obtained by the SS process of the lock sound generation period; 115, an audio signal obtained by the SS process of the shake correction driving noise generation period; 116, an audio signal obtained by the SS process of the period including only the object sound or dark noise; 118a, a state in which the signal is discarded in the predictive process; and 118, an audio signal after the predictive process. The audio signals 111 to 116 in FIGS. 19A to 19E correspond to 101 to 106 in FIGS. 16A to 16D, respectively. The audio signal 118 corresponds to 108 in FIG. 18. In FIG. 19D, signal discard is expressed by nullifying the signal of the portion of interest.

As is apparent from FIGS. 19A to 19E, even if the audio signal 116 including distortion of the object sound or the audio signal 112 without sufficient noise reduction exists, the appropriate audio signal 118 generated by prediction can be obtained by discarding these signals.

The description has been made with reference to FIGS. 19A to 19E in correspondence with FIGS. 16A to 16D. However, the problem shown in FIGS. 17A to 17C can also obviously be solved. More specifically, when the predictive period is set to include frame 2 in FIGS. 17A to 17C, the audio signal 112 including distortion of the object sound or the audio signal 107 without sufficient noise reduction is discarded, and the appropriate audio signal can be obtained.

Finally, a case will be explained in which the order of the predictive process and the noise reduction other than it is reversed, and the effect obtained by defining the order as in the present invention will be clarified.

Figure 20:
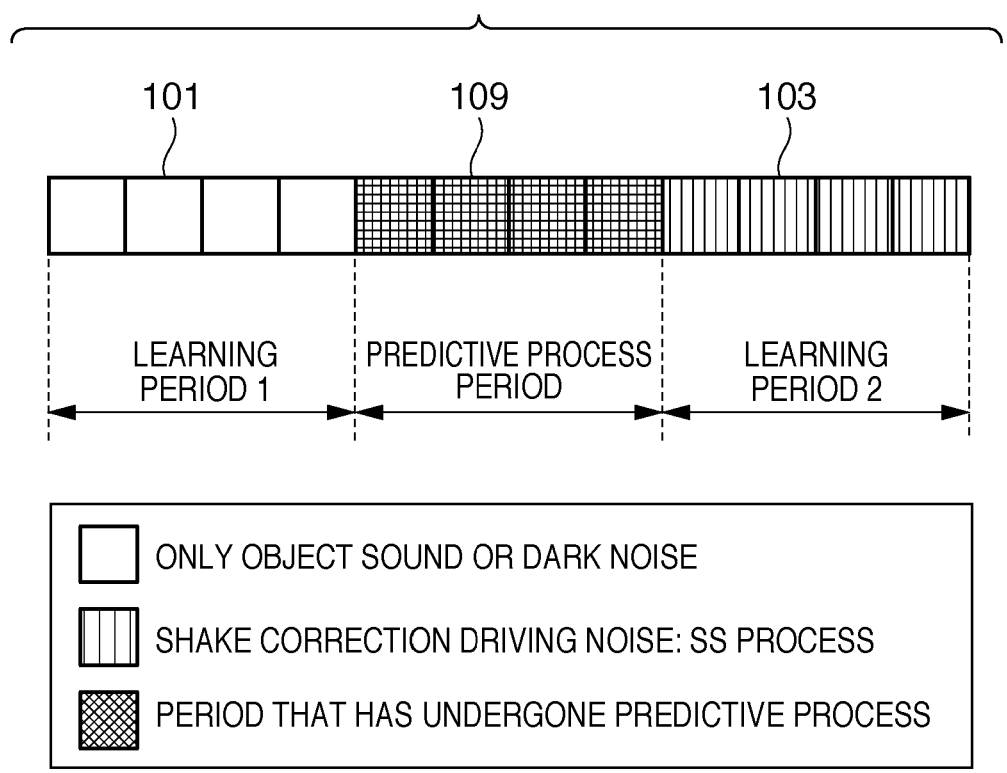
FIG. 20 is a view showing a case in which the predictive process is executed before the SS process.

FIG. 20 schematically shows a case in which the predictive process is executed before the SS process. The same reference numerals as in FIGS. 16A to 16D and FIGS. 17A to 17C denote the same signals in FIG. 20. Referring to FIG. 20, reference numeral 109 denotes an audio signal generated by the predictive process.

One problem in this case is in the audio signal 109 generated using the audio signal 103 in the shake correction driving noise generation period. That is, since the degree of noise remaining in the audio signal 109 is not clear, the intensity of the SS process or the filter process to be executed is indefinite.

The other problem is in the start timing of the SS process or the filter process when the influence of noise on the audio signal 109 is assumed to gradually increase.

Figure 21A:
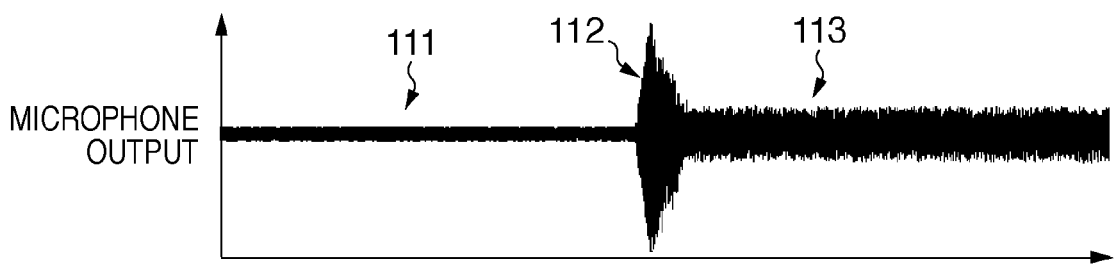
FIGS. 21A to 21E are views showing a case in which the intensity and timing of the SS process are inappropriate.
Figure 21B:
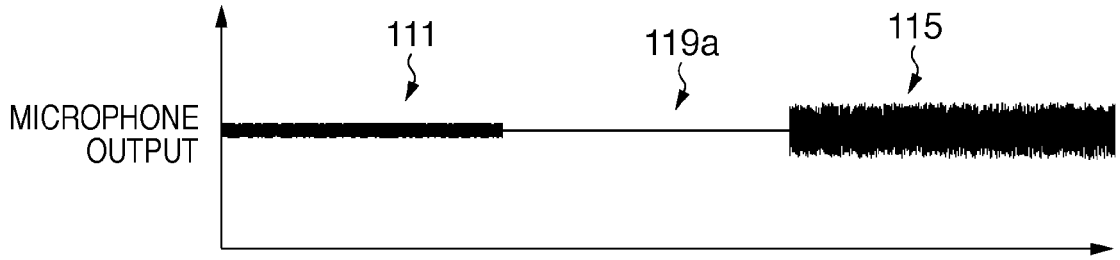
Figure 21C:
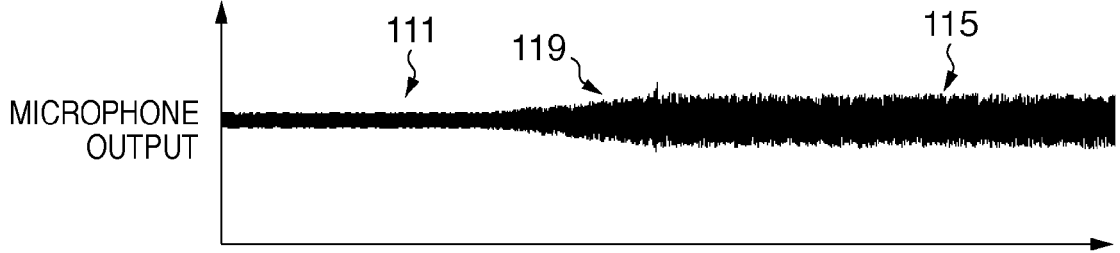
Figure 21D:
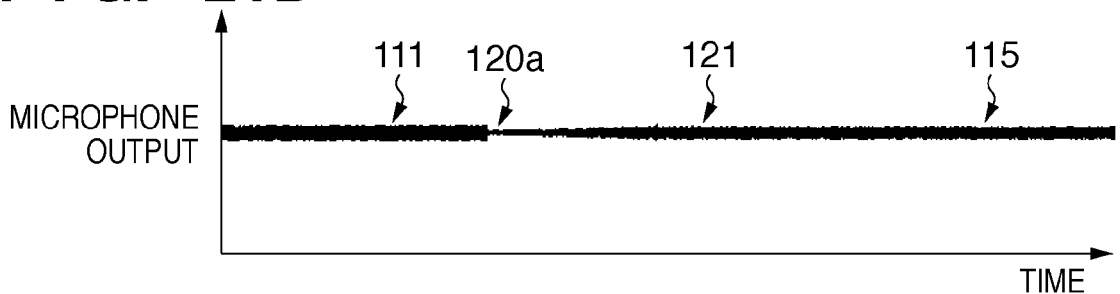
Figure 21E:
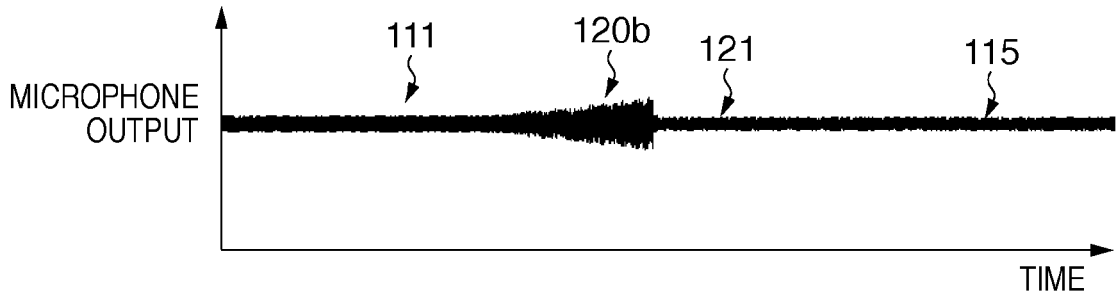

These problems will be described with reference to FIGS. 21A to 21E. Referring to FIGS. 21A to 21E, the abscissa represents time, the ordinate represents the output of the microphone 7, and the same reference numerals as in FIGS. 19A to 19E denote the same signals. FIG. 21A shows the audio signal before the predictive process, FIG. 21B shows the audio signal during the predictive process, FIG. 21C shows the audio signal after the predictive process, FIG. 21D shows the audio signal when the intensity of the SS process is inappropriate, and FIG. 21E shows the audio signal when the timing of the SS process is inappropriate.

Referring to FIGS. 21A to 21E, reference numeral 119a denotes a state in which the signal is discarded in the predictive process; 119, an audio signal after the predictive process; 120a, an audio signal distorted by oversubtraction of the spectrum; 120b, an audio signal containing residual noise; and 121, an audio signal after the SS process. The signals 111 to 115 correspond to the signals 101 to 105 in FIGS. 16A to 16D, and the signal 119 corresponds to the signal 109 in FIG. 20.

When the predictive process is performed first, the signal in FIG. 21C is obtained. In the examples of FIGS. 21A to 21E, the audio signal 119 generated by the predictive process is generated by appropriately overlapping and adding the predictive signals before and after. However, the influence of noise at that portion is indefinite, as shown in FIGS. 21A to 21E.

When the SS process is performed for the audio signal 115, the signal shown in FIG. 21D is generated. That is, a portion of the audio signal 119 where the degree of the influence of noise is the same as that in the audio signal 115 is appropriately processed to obtain the audio signal 121. On the other hand, a portion of the audio signal 119 where the degree of the influence of noise is smaller than that in the audio signal 115 excessively undergoes the SS process to obtain the audio signal 120a including distortion of the object sound.

As another method, when the SS process is executed from the portion of the audio signal 119 where the degree of the influence of noise is the same as that in the audio signal 115, the signal in FIG. 21E is obtained. In this case, the audio signal 120b containing residual noise can be obtained.

In this embodiment, the shake correction driving circuit 9b has been exemplified as the noise source. However, the present invention is also applicable to another driving unit such as the focus lens driving circuit 9a. In this case, assume that the movable portion of the focus lens driving circuit 9a mechanically collides against the stopper. When the movable portion of the focus lens driving circuit 9a is being driven, stationary noise is generated by the motor, gears, and the like. When colliding against the stopper, large noise is generated in a short time.

As described above, according to this embodiment, the PLC process 44e or the LPC process 44f serving as the first noise reduction unit is executed after the SS process 44a or the filter process 44b serving as the second noise reduction unit. It is therefore possible to obtain an audio signal from which the noise is appropriately reduced. This contributes to improvement of user convenience.

In the above-described embodiments, an example has been described in which the present invention is applied to a digital (video) camera. However, the present invention is not limited to this, and can also be applied to any apparatus that has a noise source and records an audio.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments The scope of the following claims is to be accorded the broadest interpretation so as to encompass all such modifications and equivalent structures and functions.

This application claims the benefit of Japanese Patent Application No 2010-133349, filed on Jun. 10, 2010, which is hereby incorporated by reference herein in its entirety.

What is claimed is:

1. An audio signal processing apparatus comprising:
an acquisition unit that acquires an audio signal;
a noise processing unit that (a) performs a first process of reducing a noise relating to a driving unit from a first audio signal acquired by the acquisition unit, and (b) performs a second process of replacing a third audio signal in a first period of a second audio signal with a fourth audio signal so as to reduce the noise relating to the driving unit from the second audio signal,
wherein the noise processing unit performs the second process after the first process is performed,
wherein the second audio signal is acquired based on the first process,
wherein the fourth audio signal is acquired based on at least one of an audio signal in a second period of the second audio signal and an audio signal in a third period of the second audio signal,
wherein the second period is a period before the first period,
wherein the third period is a period after the first period, and
wherein the first period is a period including the noise relating to the driving unit.

2. The audio signal processing apparatus according to claim 1, wherein the driving unit is used for driving a lens unit.

3. The audio signal processing apparatus according to claim 1, wherein the first process includes a process of subtracting a spectrum corresponding to a driving of the driving unit from a spectrum of the first audio signal.

4. The audio signal processing apparatus according to claim 1, wherein the second process includes a process of replacing the third audio signal with the fourth audio signal by discarding the third audio signal.

5. The audio signal processing apparatus according to claim 1, wherein the fourth audio signal is a copy of one of an audio signal in the second period and an audio signal in the third period.

6. The audio signal processing apparatus according to claim 1, wherein the driving unit is used for driving a lens unit, and wherein the lens unit is used for performing a shake correction.

7. The audio signal processing apparatus according to claim 6, wherein the first period is a period including a noise to be occurred if the lens unit is unlocked.

8. The audio signal processing apparatus according to claim 1, wherein the second process is performed for reducing a noise relating to a process of controlling an amount of light to be supplied to an image sensor.

9. The audio signal processing apparatus according to claim 1, wherein the second process is performed for reducing a noise relating to an operation of an operation button.

10. The audio signal processing apparatus according to claim 1, wherein the driving unit is used for driving a focus lens unit.

11. The audio signal processing apparatus according to claim 1, wherein the first process includes a process of filtering out an audio signal having a predetermined frequency range from the first signal.

12. A method comprising:
acquiring an audio signal;
performing a first process of reducing a noise relating to a driving unit from a first audio signal; and
performing a second process of replacing a third audio signal in a first period of a second audio signal with a fourth audio signal so as to reduce the noise relating to the driving unit from the second audio signal, wherein the second process is performed after the first process is performed, wherein the second audio signal is acquired based on the first process, wherein the fourth audio signal is acquired based on at least one of an audio signal in a second period of the second audio signal and an audio signal in a third period of the second audio signal, wherein the second period is a period before the first period, wherein the third period is a period after the first period, and wherein the first period is a period including the noise relating to the driving unit.

13. The method according to claim 12, wherein the first process includes a process of subtracting a spectrum corresponding to a driving of the driving unit from a spectrum of the first audio signal.

14. The method according to claim 12, wherein the second process includes a process of replacing the third audio signal with the fourth signal by discarding the third audio signal.

15. The method according to claim 12, wherein the fourth audio signal is a copy of one of an audio signal in the second period and an audio signal in the third period.

16. The method according to claim 12, wherein the driving unit is used for driving a lens unit, and wherein the lens unit is used for performing a shake correction.

17. The method according to claim 12, wherein the first period is a period including a noise to be occurred if the lens unit is unlocked.

18. The method according to claim 12, wherein the second process is performed for reducing a noise relating to a process of controlling an amount of light to be supplied to an image sensor.

19. The method according to claim 12, wherein the second process is performed for reducing a noise relating to an operation of an operation button.

20. The method according to claim 12, wherein the first process includes a process of filtering out an audio signal having a predetermined frequency range from the first audio signal.

* * * * *